United States Patent [19]

Petersen

[11] Patent Number: 5,467,347
[45] Date of Patent: Nov. 14, 1995

[54] CONTROLLED ACCESS ATM SWITCH

[75] Inventor: Lars-Göran Petersen, Tumba, Sweden

[73] Assignee: Telefonaktiebolaget LM Ericsson, Stockholm, Sweden

[21] Appl. No.: 283,716

[22] Filed: Aug. 1, 1994

Related U.S. Application Data

[63] Continuation of Ser. No. 11,378, Jan. 29, 1993, abandoned.

[51] Int. Cl.[6] .................................................. H04L 12/56
[52] U.S. Cl. ....................... 370/60.1; 370/61; 340/825.79
[58] Field of Search .......................... 340/825.79, 825.86; 370/58.1, 60, 60.1, 61, 62

[56] References Cited

U.S. PATENT DOCUMENTS

| | | | |
|---|---|---|---|
| 4,692,917 | 9/1987 | Fujioka | 370/60 |
| 4,973,956 | 11/1990 | Lin et al. | 340/825.86 |
| 5,038,343 | 8/1991 | Lebizay et al. | 370/60 |
| 5,079,762 | 1/1992 | Tanabe | 370/60 |
| 5,126,999 | 6/1992 | Munter et al. | 370/60 |
| 5,128,931 | 7/1992 | Yamanaka et al. | 370/61 |
| 5,140,582 | 8/1992 | Tsuboi et al. | 370/60 |
| 5,144,293 | 9/1992 | Rouse | 370/60 |
| 5,150,358 | 9/1992 | Punj et al. | 370/61 |

OTHER PUBLICATIONS

William E. Stephens, Martin DePrycker, Fouad A. Tobagi and Takehiko Yamaguchi; "Large-Scale ATM Switching Systems for B-ISDN"; IEEE Journal, vol. 9, No. 8, Oct. 1991, pp. 1157–1160.

H. Jonathan Chao; "A Recursive Modular Terabit/Second ATM Switch"; IEEE Journal, vol. 9, No. 8, Oct. 1991, pp. 1161–1172.

Fouad A. Tobagi, Timothy Kwok and Fabio M. Chiussi; "Architecture, Performance, and Implementation of the Tandem Banyan Fast Packet Switch"; IEEE Journal, vol. 9, No. 8, Oct. 1991, pp. 1173–1193.

Shigeo Urushidani; "Rerouting Network: A High-Performance Self-Routing Switch for B-ISDN"; IEEE Journal, vol. 9, No. 8, Oct. 1991, pp. 1194–1204.

Shih-Chian Yang and John A. Silvester; "A Reconfigurable ATM Switch Fabric for Fault Tolerance and Traffic Balancing"; IEEE Journal, vol. 9, No. 8, Oct. 1991, pp. 1205–1217.

Arata Itoh; "A Fault-Tolerant Switching Network for B-IDSN"; IEEE Journal, vol. 9, No. 8, Oct. 1991, pp. 1218–1226.

Thomas C. Banwell, Renée C. Estes, Sarry F. Habiby; Gary A. Hayward; Thomas K. Helstern, Gail R. Lalk, Derek D. Mahoney, Donald K. Wilson and Kenneth C. Young, Jr.; "Physical Design Issues for Very Large ATM Switching Systems"; IEEE Journal, vol. 9, No. 8, Oct. 1991, pp. 1227–1238.

Takahiko Kozaki, Noboru Endo, Yoshito Sakurai, Osamu Matsubara, Masao Mizukami and Kenichi Asano; "32×32 Shared Buffer Type ATM Switch VLSI's for B-ISDN's"; IEEE Journal, vol. 9, No. 8, Oct. 1991, pp. 1239–1247.

Yasuro Shobatake, Masahiko Motoyama, Emiko Shobatake, Takashi Kamitake, Shoichi Shimizu, Makoto Noda and Kenji Sakaue; "A One-Chip Scalable 8 * 8 ATM Switch LSI Employing Shared Buffer Architecture"; IEEE Journal, vol. 9, No. 8, pp. 1248–1254.

(List continued on next page.)

*Primary Examiner*—Benedict V. Safourek
*Attorney, Agent, or Firm*—Jenkens & Gilchrist

[57] ABSTRACT

An asynchronous transfer mode (ATM) switch in which access to a switchcore matrix is monitored and controlled through the logic and buffering functions of switchports connected thereto. The switchcore is greatly simplified by moving the logic and buffering functions to the switchports. The switchcore matrix comprises a plurality of rows, columns, and crosspoints thereof, providing routing paths for the routing of information cells from input points to output points on the matrix. Single-cell buffers in the switchcore matrix enable temporary storage and hand-off of individual information cells as they pass through the matrix. The simplicity of the switchcore matrix enables it to be constructed on a single integrated circuit.

38 Claims, 12 Drawing Sheets

OTHER PUBLICATIONS

Thomas R. Banniza, Gert J. Eilenberger, Bart Pauwels and Yves Therasse; "Design and Technology Aspects of VLSI's for ATM Switches"; IEEE Journal, vol. 9, No. 8, Oct. 1991, pp. 1255–1264.

Manolis Katevenis, Stefanos Sidiropoulos and Costas Courcoubetis; "Weighted Round–Robin Cell Multiplexing in a General–Purpose ATM Switch Chip"; IEEE Journal, vol. 9, No. 8, Oct. 1991, pp. 1265–1279.

Atsuo Itoh, Wataru Takahashi, Hiroshi Nagano, Masaru Kurisaka and Susumu Iwasaki; "Practical Implementation and Packaging Technologies for a Large–Scale ATM Switching System"; IEEE Journal, vol. 9, No. 8, Oct. 1991, pp. 1280–1288.

James N. Giacopelli, Jason J. Hickey, William S. Marcus, W. David Sincoskie and Morgan Littlewood; "Sunshine: A High–Performance Self–Routing Broadband Packet Switch Architecture"; IEEE Journal, vol. 9, No. 8, Oct. 1991, pp. 1289–1298.

Wolfgang Fischer, Oswald Fundneider, Ernst–Heinrich Goeldner and K. A. Lutz; "A Scalable ATM Switching System Architecture"; IEEE Journal, vol. 9, No. 8, Oct. 1991, pp. 1299–1307.

Haruhiko Matsunaga and Hitoshi Uematsu; "A 1.5 Gb/s 8×8 Cross–Connect Switch Using a Time Reservation Algorithm"; IEEE Journal, vol. 9, No. 8, Oct. 1991, pp. 1308–1317.

Michael D. Schroeder, Andrew D. Birrell, Michael Burrows, Hal Murray, Roger M. Needham, Thomas L. Rodeheffer, Edwin H. Satterthwaite and Charles P. Thacker; "Autonet: A High–Speed, Self–Configuring Local Area Network Using Point–to–Point Links"; IEEE Journal, vol. 9, No. 8, Oct. 1991, pp. 1318–1335.

Ioannis Stavrakakis; "Efficient Modeling of Merging and Splitting Processes in Large Networking Structures"; IEEE Journal, vol. 9, No. 8, Oct. 1991, pp. 1336–1347.

Arturo Cisneros and Charles A. Brackett; "A Large ATM Switch Based on Memory Switches and Optical Star Couplers"; IEEE Journal, vol. 9, No. 8, Oct. 1991, pp. 1348–1360.

CONTROLLED ACCESS ATM SWITCH

This is a continuation of application Ser. No. 08/011,378, filed Jan. 29, 1993, now abandoned.

BACKGROUND OF THE INVENTION

1. Field of the Invention

This invention relates to Asynchronous Transfer Mode (ATM) switches, and in particular, to the implementation of flow control and isochrone traffic within ATM switching systems.

2. Description of Related Art

Asynchronous Transfer Mode (ATM), also known as "cell relay", is a telecommunications standards-based technology designed to meet the demand for the public network to simultaneously multiplex and switch data over a wide spectrum of data rates. These requirements are the result of emerging multimedia, high-speed data and imaging applications. ATM is a statistical multiplexing and switching method which is based on fast packet switching concepts, and is a radical departure from the circuit switching techniques that are used by today's digital switches. ATM provides dedicated circuits for voice, data, and video communications by dividing the information flow within each of these three types of traffic into individual "cells", each cell including an address or directions specifying the location to which the information carried within the cell should be delivered. Direction instructions are added to the information carried by the cell in the form of a label, which is processed by the ATM switch as the cell is routed through the switch.

Several factors drive the design of broad-band ATM switching architectures:

1. The need to accommodate a wide range of traffic types from voice to video to data;
2. The high speed at which the switch has to operate (from 155 Mb/s to over 1.2 Gb/s); and
3. The burst-like nature of data communications.

If communications networks continue to be deployed with large switches in central locations, then a large-scale ATM switch will be necessary. If such a switch is to serve 50,000 to 100,000 customers, each operating at the SONET STS-3 rate (155 Mb/s), then the total customer access capacity at the switch-customer interface is about 10 terabits per second (Tb/s) in each direction. If only one-in-ten customers use their assigned access capacity at any one time, then the core of this large-scale ATM switch must be capable of switching about 1 Tb/s of traffic, which is several orders of magnitude larger than the capacity of today's local digital switches.

Several high-performance packet switching fabrics have been proposed in the past. These switch fabrics can be categorized into different architectures—internal buffer, input buffer, output buffer, shared buffer, or various combinations of these. Internal-buffered switches include the buffered banyan network. With the assumption of having single-cell buffers at the intermediate stage, and a balanced and uniform traffic pattern, the banyan switch's maximum throughput is only about 45% of that required for large-scale ATM switches. Input-buffered architectures include Batcher-banyan networks with ring reservation, or a self-routing crossbar network with parallel, centralized contention resolution. Because of head-of-line (HOL) blocking, its maximum throughput is about 58% of that required. Certain techniques, such as allowing two cells of each input port to compete with others increases the maximum throughput of input-buffered architectures to approximately 70%.

The other types of ATM switch architectures each have their own advantages. Switches with output buffering, for example, have been proven to give the best delay/throughput performance in large-scale switch architectures. The shared buffer architectures have been shown to improve memory utilization significantly. Other switches in the prior art include those equipped with mixed input and output buffers, and a Sunshine switch implemented with both internal and output buffers. Besides point-to-point switches, several multicast ATM switches have also been proposed.

Each type of switch architecture has its own advantages and disadvantages. For example, the Batcher-banyan network has fewer switch elements than a crossbar network does, but it has more difficulty in synchronizing all signals in every stage because interconnection wires are not identical between stages, and the wire-length difference increases as the network grows. Conversely, the crossbar network has more uniform and regular interconnections, resulting in easier synchronization, but it has more switch elements.

All of the prior art switches, and most of the current research in the area of ATM switching, is oriented toward developing switchcores of greater magnitude and complexity in order to provide the switching capacity necessary for a large-scale central switch operating under its maximum projected traffic load. Networks utilizing a dozen or more ATM chips have been designed in such switches in order to provide the large buffers and multiple pathways necessary to ensure a high probability that a cell will pass through the switchcore. There is also a great need, however, for high quality ATM switches which are optimally designed for smaller relay nodes within various communications networks. None of the prior art ATM switch architectures, large or small, solve the capacity, throughput, and loss problems using access control, and none are capable of providing isochronal service.

SUMMARY OF THE INVENTION

In one aspect, the present invention is an asynchronous transfer mode (ATM) switch comprising a switchcore matrix and a plurality of switchports electronically connected to the switchcore matrix at input and output points. The switchports transmit and receive information cells from the switchcore matrix. The switchcore matrix provides routing paths for the routing of the information cells from the input points to the output points on the matrix through a plurality of rows, columns, and crosspoints thereof. The switchcore has multicast and broadcast capability. The switchports provide the interface between the ATM switch and external communications devices. The switchports also interface with the switchcore matrix by means of a switchcore interface, and control access to the switchcore matrix by means of feedback information from the switchcore matrix crosspoints. Access to the switchcore matrix may be controlled by one or more input buffers which store information cells until selected routing paths in the switchcore matrix are free. A plurality of switchcore matrices may be link-coupled to enhance switch performance.

In another aspect, the present invention is a method for controlling the flow of information cells within a communications system. The method begins by providing selectable routing paths for the routing of information cells from input points to output points of a switchcore matrix having a plurality of rows, columns, and crosspoints thereof. A plurality of switchports are then electronically connected to the input and output points of the switchcore matrix to transmit information cells thereto and receive information cells therefrom. This is followed by connecting each of the switchports to an external information cell communications device, and controlling access to the switchcore matrix available to each of the information cells. The step of controlling access to the switchcore matrix may also include storing the information cells in one or more input buffers located within each of the switchports until selected routing paths in the switchcore matrix are free.

It is an object of the present invention to provide an ATM switch with access control, which enables the quality of the connection through the switch to be controlled from units connected thereto, and eliminates the need for large buffers in the switchcore.

It is another object of the present invention to provide an ATM switch which maximizes the use of available bandwidth for data communications traffic, which is burst-like in nature, and which greatly reduces the loss rate of the switch. Cell loss often occurs in prior art switches when one stage of a switch transmits an information cell when the buffer of the receiving stage is full. When utilizing access control, information cells are held in input buffers, which are sized for the type of communications to be handled, until output buffers or ports are available. Losses are greatly reduced because they only occur if the input buffers are overloaded, and if the input buffers are properly sized, overloading is very rare.

It is still another object of the present invention to provide an ATM switch with properties which are similar to a local area network (LAN), thereby enabling the switch to better handle future data communications demands in public networks.

It is still another object of the present invention to provide an ATM switch that accommodates communications devices of differing speeds, thereby enabling new devices and future upgrades with higher speed capabilities to be attached, e.g., SONET STS 12c devices, without affecting lower speed devices which are already attached. This objective assures upgrading of existing equipment without the need to replace the entire ATM switch, provided that the switch core is upgraded at the same time to handle the increased speed.

It is still yet another object of the present invention to provide an ATM switch which may be modified to provide a predetermined delay when transmitting information cells, thereby enabling so-called isochronal traffic.

BRIEF DESCRIPTION OF THE DRAWING

The invention will be better understood, and its numerous objects and advantages will become apparent to those skilled in the art by reference to the following drawing in which.

DETAILED DESCRIPTION OF THE INVENTION

Figure 1:
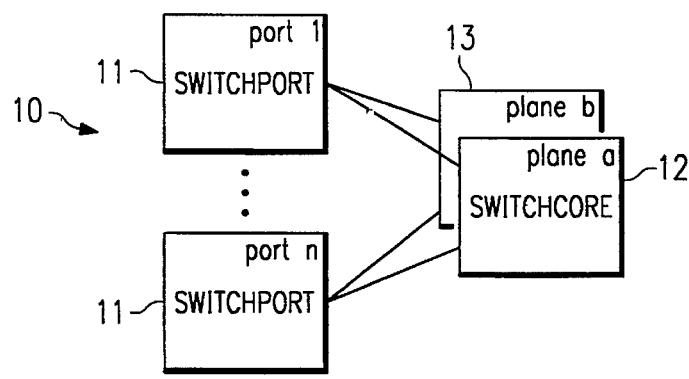
FIG. 1 is a simplified block diagram of the major components of a controlled access ATM switch of the type employed in the system of the present invention.
Figure 2:
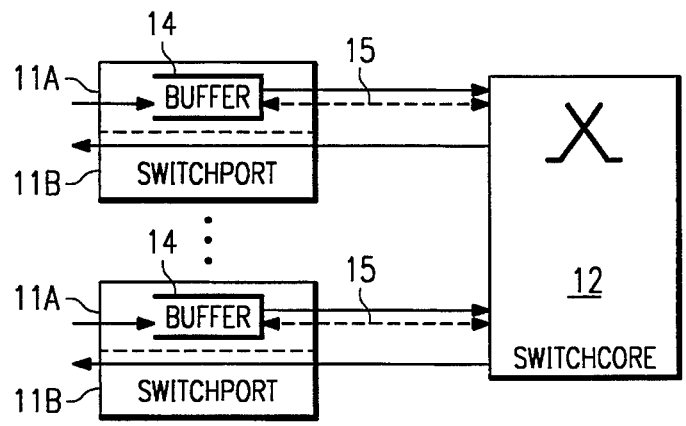
FIG. 2 is a simplified functional block diagram of the ATM switch of FIG. 1, illustrating the data flow between switchports and the switchcore, and showing where input buffers are placed in the switchports in the system of the present invention.

FIG. 1 is a simplified block diagram of the major components of an controlled access ATM switch 10 of the type employed in the implementation of the principles of the present invention. The ATM switch of the present invention is essentially comprised of two parts: one or more switchports 11 and a switchcore 12. Each switchport 11 performs the logic switching and buffering functions of the ATM switch 10, and is divided into an input side 11A and an output side 11B, as shown in FIG. 2. The switchcore 12 essentially performs only routing functions based on a label added to each information cell, and may be implemented in a single chip. This greatly reduces the hardware and maintenance cost of the switchcore, and greatly increases its reliability, especially if a second plane 13 is provided for redundancy, as shown in FIG. 1.

FIG. 2 is a simplified functional block diagram illustrating the data flow between switchports 11 and the switchcore 12, and showing where input buffers 14 are placed in the switchports 11. In one embodiment, the switchcore 12 in the present invention is greatly simplified over the prior art switches. This is in part because the input buffers 14 are moved from within the switchcore 12, where they are located in most coventional ATM switches, to the input side of the switchports 11A. The switchcore 12 therefore comprises only a switch matrix and a status register for each column in the matrix with an appended prioritizing mask register for fair transmission of cells. The switchcore 12 has a buffer depth of only one store for each path or route, and has no processor or any other communication channel for operation and maintenance.

The consequence of buffering in the switchport 11 is that the bandwidth must be increased on the input side 11A of each individual switchport connection to enable the switchport to receive a large amount of data in a short period or to receive data from several input sources nearly simultaneously. However, the storage capacity of each buffer 14 can be tailored to the individual requirements of each switchport 11, and of the type of traffic it handles, thereby improving overall system characteristics and cost. Each switchport 11 may be designed with a different sized input buffer 14, and may be made either more or less complex, depending on the type of communications service involved. For example, for conventional telephone service, with a continuous, low data-rate flow of information through the switch, a small input buffer 14 will suffice. For data communications, the information flow of which is more burst-like in nature, a larger input buffer 14 is required. Thus, overall cost of the ATM switch 10 is reduced since the design of the input buffers 14 can be tailored to the anticipated service type, and only the necessary buffer space provided.

In addition to the advantages of tailored individual buffer distribution, the introduction of access control and buffering in the switchport 11 provides a "guarantee" that the cells will pass through the switchcore 12 because the switchport 11 holds the cell in its buffer 14 while determining the status of its assigned routes through the switchcore 12, and releases the cell only when a route and a destination switchport is free.

The dotted line 15 in FIG. 2 represents the flow of access monitoring and protocol control information (PCI) which determines when each switchport 11 can transmit the information in its input buffer 14 through the switchcore 12. This monitoring and control process will be discussed in greater detail below.

The communication between the switchcore 12 and the different switchports 11 may be asynchronous or synchronous. The asynchronous communication is controlled by each switchport 11 and allows one switchport to send and receive at a high rate while another switchport sends and receives at a low rate. The synchronous communication requires that the switchports 11 requiring synchronization use a clock distribution signal in the switchcore 12. In this case one switchport acts as a master, and the other switchports act as slaves. The master switchport delivers the synchronizing clock signal to the slave switchports.

Figure 3:
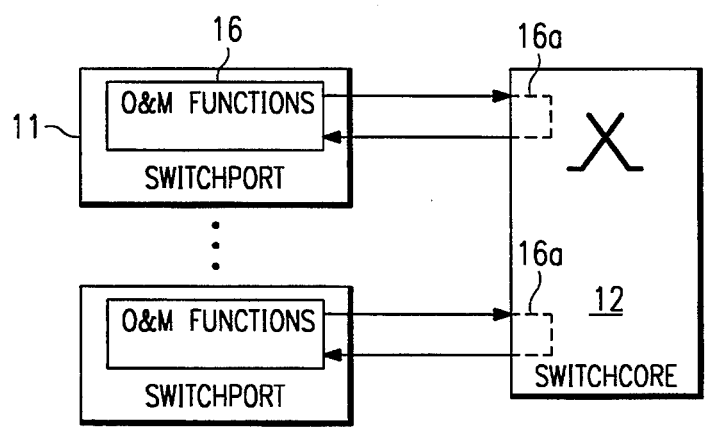
FIG. 3 is a simplified functional block diagram of the ATM switch illustrating the manner in which operation and maintenance functions are monitored and controlled from the switchports in the system of the present invention.

FIG. 3 is a simplified functional block diagram illustrating the manner in which operation and maintenance functions are monitored and controlled from the switchports 11. Each switchport 11 controls and monitors the operation and maintenance (O&M) functions on the routes in the switchcore 12 which are capable of being used by each respective switchport 11. The dashed lines 16a in FIG. 3 indicate that the O&M functions are performed on the routes through the switchcore 12, but not on the switchcore itself.

Figure 4:
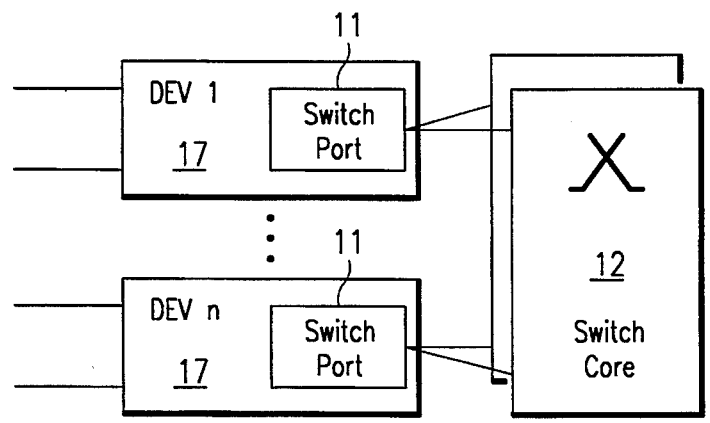
FIG. 4 is a simplified block diagram illustrating how all communications devices connected to the controlled access ATM switch of the present invention have access to the switchcore via the switchports.

FIG. 4 is a simplified block diagram illustrating how all communication devices 17 connected to the controlled access ATM switch 10 have access to the switchcore 12 via the switchports 11. The switchports 11 provide the interface between the communication devices 17 and the switchcore 12. The switchports 11 may, for example, when carrying standard telephone traffic, convert the signal from standard C1 carrier format into ATM packet format having up to 56 bytes of information in each cell.

Figure 5:
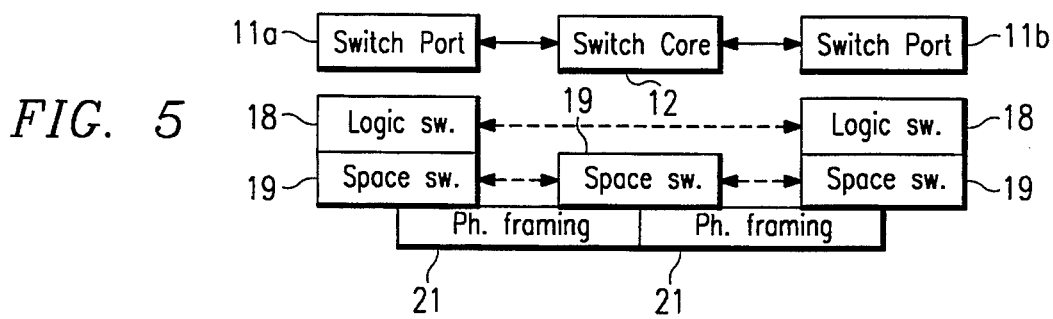
FIG. 5 is a simplified functional block diagram illustrating the logic switching and space switching functions performed by the controlled access ATM switch of the present invention.

FIG. 5 is a simplified functional block diagram illustrating the logic switching and space switching functions performed by the controlled access ATM switch of the present invention. The logic and space switching functions are implemented through three protocol levels: ATM Logic Switching (ALS) 18, ATM Space Switching (ASS) 19 and physical framing 21. ALS 18 provides the interface between the ATM switch 10 and external network devices 17, and is performed within the switchports 11. ALS 18 translates incoming Virtual Channel Identifier/Virtual Path Identifier (VCI/VPI) numbers to outgoing numbers on both the input and output sides of the ATM switch 10. ASS 19 is a protocol which passes information cells between switchports 11 and the switchcore 12. ASS 19 is performed as the logic address from the switchport 11 is translated in the switchcore 12 to a physical address for space switching. Physical framing 21 indicates that the transfer of cells may be aligned with a framing reference in order to synchronize switchports 11 to each other.

Of the three protocols described, ATM Space Switching (ASS) 19 is the protocol with the greatest significance to the present invention. ASS 19 is a collection of functions and procedures carried out on an ATM Space Switch level. The functions are carried out partly in the switchport 11 and partly in the switchcore 12. The functions enable the extraction of cellsync and bytesync, maintenance of the switchcore 12, control of access to the switchcore, and determination of the status of sent/received cells. The functions are driven by the protocol control information (PCI) 15 transmitted from switchport 11 to switchcore 12 (and vice versa ) and by the primitives from superior or controlling layers.

Figure 6:
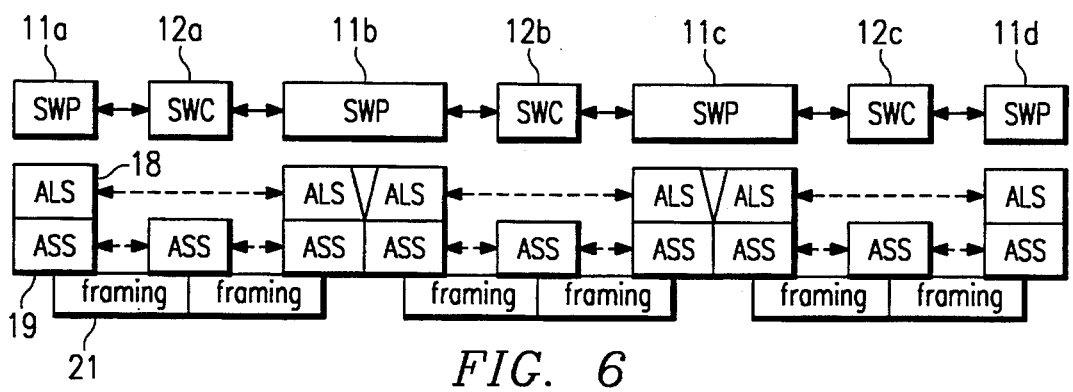
FIG. 6 is a simplified functional block diagram illustrating the logic and space switching functions when several controlled access ATM switches are link-coupled in a matrix architecture.

FIG. 6 is a simplified functional block diagram illustrating the logic and space switching functions when several controlled access ATM switches 10 are link-coupled in a matrix architecture or any other structure such as CLOS. Providing large buffers 14 in the switchports (SWP) 11a–d permits a high degree of concentration without impairing the properties of the system for data communication traffic through the switchcores (SWC) 12a–c. The divided line in the ALS level of the inner switchports 11b and 11c illustrates symbolically that there are two mutually facing selector ports.

Figure 7:
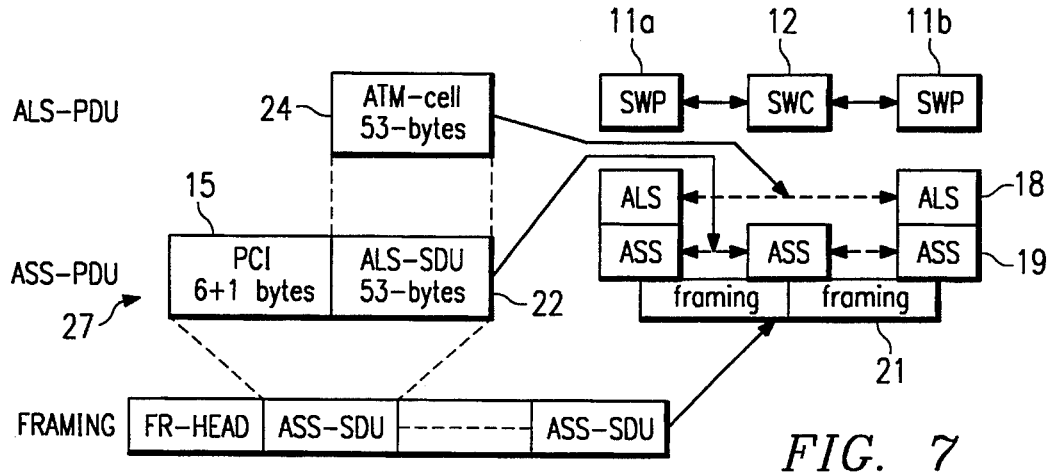
FIG. 7 is a simplified functional block diagram illustrating the structure and relationships between the three communications protocol levels which perform the logic and space switching functions in the controlled access ATM switch of the present invention.

FIG. 7 is a simplified functional block diagram illustrating the structure and relationships between the three communications protocol levels which perform the logic and space switching functions in the controlled access ATM switch 10 of the present invention. An ATM-cell 24, comprising 53 bytes of information, may be stored in the ALS-PDU. When the cell is put into the ALS-SDU 22, which comprises 56 bytes of information, three (3) bytes are left for free use. The ALS-SDU 22, together with the PCI 15 of 4 bytes, are then put into the ASS-PDU 27 which comprises 60 bytes, and are then relayed to the other ALS-entity 18 or vice versa. The functions are performed partly in the switchport 11 and partly in the switchcore 12. The functions are driven by the PCI 15 transmitted from switchport 11 to switchcore 12 (and vice versa) and by primitives from superior of controlling layers.

The switchcore interface (SCI) is the interface between the switchports 11 and the switchcore 12. Information cells, maintenance cells and idle cells are mixed on the SCI. The information cells are routed through the switchcore 12 while the maintenance and idle cells are terminated on both sides of the SCI.

Figure 8:
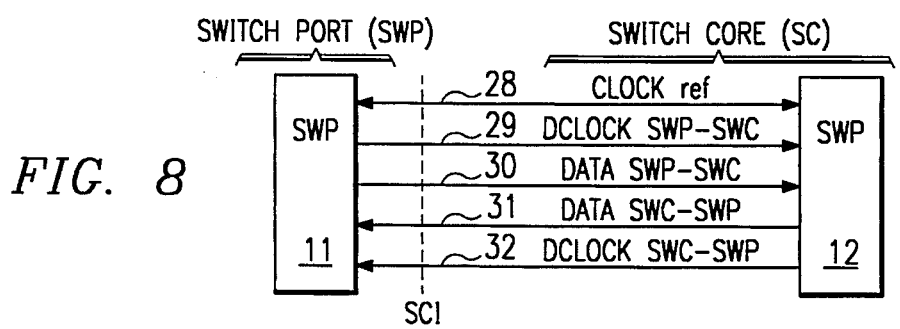
FIG. 8 is a block diagram illustrating the physical lines of the switchcore interface (SCI) between one switchport and one plane of the switchcore.

FIG. 8 is a block diagram illustrating the physical lines of the SCI between one switchport 11 and one plane of the switchcore 12. The physical lines comprise a bidirectional CLOCK ref line 28, a DCLOCK SWP-SWC line 29 from switchport 11 to switchcore 12, a DATA SWP-SWC line 30 from switchport 11 to switchcore 12, a DATA SWC-SWP line 31 from switchcore 12 to switchport 11, and a DCLOCK SWC-SWP line 32 from switchcore 12 to switchport 11. Thus, each line except the CLOCK ref line 28 is implemented as a balanced pair.

Figure 8A:
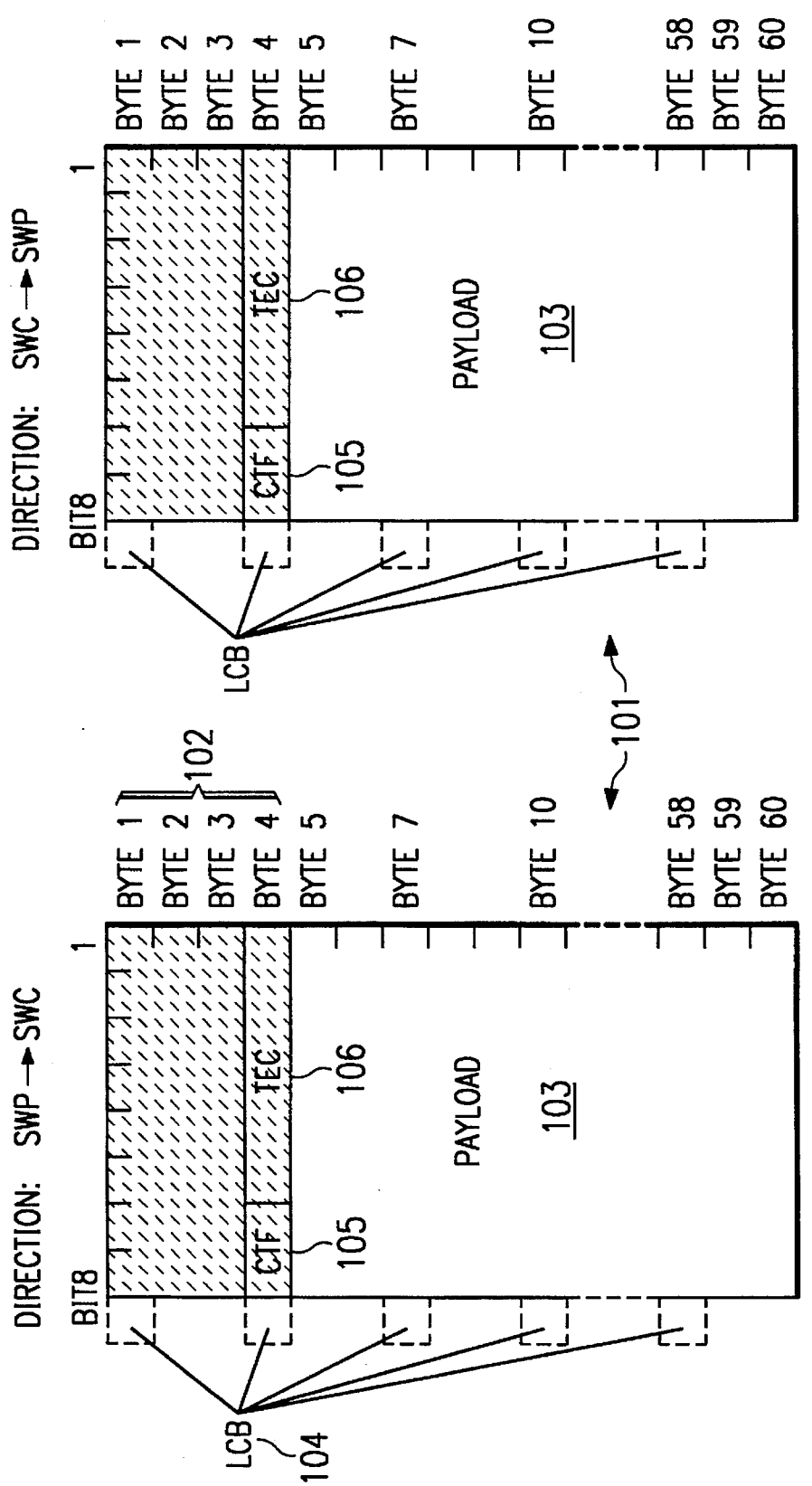
FIG. 8a is a byte map of a generic cell as it is sent in each direction over the switchcore interface (SCI)

FIG. 8a is a byte map of a generic cell 101 as it is sent in each direction over the SCI. The cell contains 60 bytes with bit 8 on byte 1 transmitted first in a serial bit-stream. Bytes 1–4 constitute an address and validation field 102, and bytes 5–60 are the payload (information) 103 carried by the cell 101. As an option for high data rates, and in particular when optical transmission line is used, a Line Code Bit (LCB) 104 may be inserted every 24th bit. Together with a two-step scrambling, the LCB 104 gives good DC balance. The switchcore 12 detects the LCB 104 and uses the same technique in the opposite direction for each individual switchport 11.

A cell type field (CTF) 105 is a two-bit coded field which is used in both directions. The codes in the CTF 105 indicate what type of cell is being transferred. The following codes, with their interpreted meanings are included:

| Code | Type of Cell | Remarks |
| --- | --- | --- |
| 00 | Idle cell | RAF not valid; RPF valid. |
| 01 | Maintenance | Carries maintenance command; RAF, RPF replaced by maintenance fields; see maintenance cell format (FIG. 8c). |
| 10 | Active traffic | Low prio cell; RAF, RPF valid |
| 11 | Active traffic | High prio; RAF, RPF valid. |

A tag error check (TEC) field 106, comprising a field of 6 bits, is generated and checked on both sides of the SCI. The TEC 106 is used for both cell synchronization and validation of the previous 26 bits in the cell.

Figure 8B:
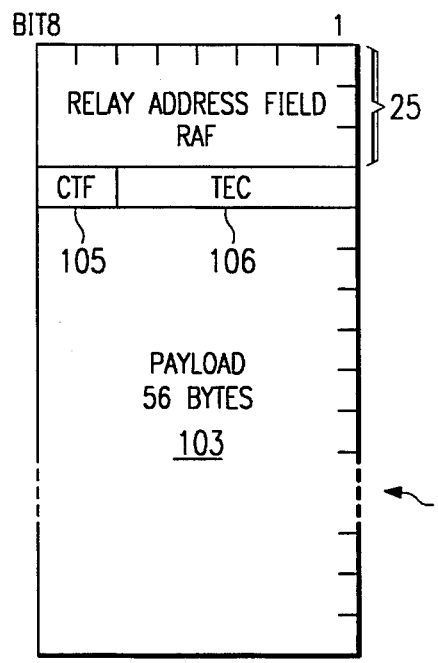
FIG. 8b is a byte map of an information (traffic) cell as it is sent in each direction over the switchcore interface (SCI)
Figure 8B:
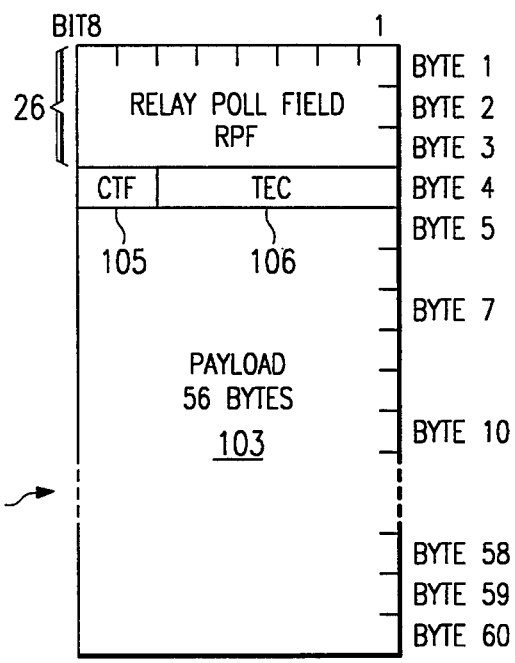

FIG. 8b is a byte map of an information (traffic) cell 111 as it is sent in each direction over the SCI. Bytes 1– 3 of the information cell 111 comprise a bitmap pinpointing the individual switchports 11 on the outside of the switchcore 12. In the sending direction (switchport to switchcore), bytes 1–3 comprise the relay address field (RAF) 25 where each bit indicates a target (receiving) switchport on the other side of the switchcore 12. In the receiving direction (switchcore to switchport), bytes 1–3 comprise the relay poll field (RPF) 26, and indicate which target switchports are occupied and which are free.

Figure 8C:
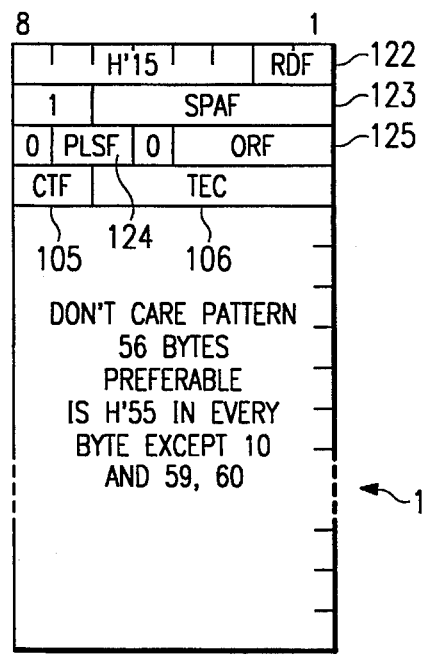
FIG. 8c is a byte map of a maintenance cell as it is sent in each direction over the switchcore interface (SCI)
Figure 8C:
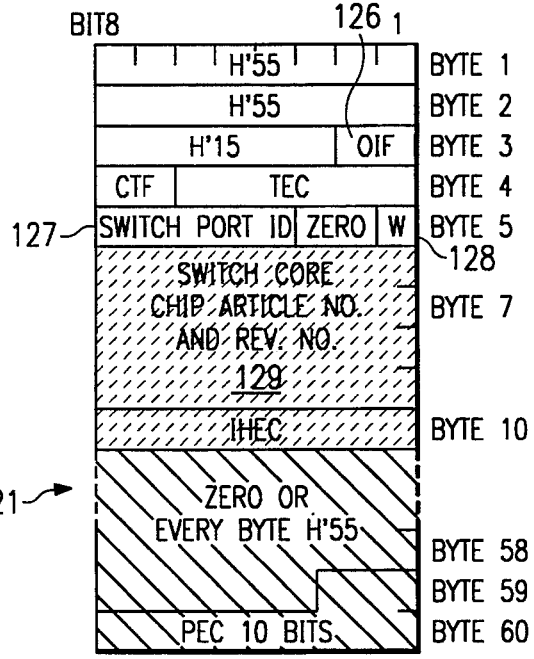

FIG. 8c is a byte map of a maintenance cell 121 as it is sent in each direction over the SCI. A number of maintenance commands may be issued from a switchport 11 to the switchcore 12 concerning the parts of the switchcore 12 which correspond to the sending switchport 11. In the sending direction, byte 1 contains a two-bit rate data field (RDF) 122 in which the following codes are included:

| Code | Meaning |
| --- | --- |
| 00 | Any rate difference between own switchport and addressed switchport can be accomodated. |
| 01 | Own switchport sending rate is higher than receiving rate from the addressed switchport. |
| 10 | Own switchport receiving rate is higher than sending rate from the addressed switchport. |
| 11 | Own switchport rate is synchronized with addressed switchport. |

In the sending direction, byte 2 contains a six-bit switchport address field (SPAF) 123 which provides the address of the switchport 11 which is sending the maintenance cell 121. There are 24 switchports 11, numbered 0–23 binary.

In the sending direction, byte 3 contains a two-bit plane select field (PLSF) 124 which selects which of the switchcore planes is to carry out the maintenance command. The following commands are included:

| Code | Meaning |
| --- | --- |
| 00 | The command is not carried out. |
| 01 | Only plane A carries out the command; both planes send acknowledgment. |
| 10 | Only plane B carries out the command; both planes send acknowledgment. |

| Code | Meaning |
| --- | --- |
| 11 | Planes A and B carry out the command. |

Byte 3 also contains a four-bit operation request field (ORF) 125. The ORF 125 may be used to request such actions as block or unblock an addressed switchport, open or close an addressed clock reference gate, set rate data between own and addressed switchport, set throttling for own switchport, clear own column or row, and set switchcore internal cell delay. The switchcore internal delay command may be used to set the delay in the switchcore so an isochronal serial transfer of cells can be made between attached devices without unnecessary delay losses. Serial isochronal support requires minimum delay in the attached devices while variable cell traffic support requires maximum delay in the switchport in order to analyze the buffer situation.

In the receiving direction, byte 3 contains a two-bit operation indication field (OIF) 126 which indicates to the switchport 11 the status of the previous cell from the switchport 11 to the switchcore 12. The OIF 126 indicates whether the previous cell had an error, or in case of a maintenance cell to the switchcore 12, whether or not it was carried out. The following codes are included:

| Code | Meaning |
| --- | --- |
| 00 | Not used. |
| 01 | Previous switchport to switchcore maintenance command carried out. |
| 10 | TEC-error in previous cell. |
| 11 | Error in field interpretation of previous switchport to switchcore maintenance cell. |

In the receiving direction, byte 5 contains a five-bit switchport identification number 127 indicating what number the switchcore 12 has given the switchport 11. The switchport identification number 127 corresponds to the SPAF 123 in the sending direction.

Byte 5 also contains a one-bit synchronization window field (W) 128 which indicates the size of the synchronization window. The synchronization window is described in greater detail below. The following codes are included:

| Code | Meaning |
| --- | --- |
| 00 (default) | Window corresponding to the timing of byte 2, allowing an additional time corresponding to one byte for CLOCK ref and switchcore internal jitter. |
| 01 | Window is 60 bytes. |

The switchcore also sends its own article number and revision number in bytes 6 through 9, as shown by shaded area 129 in FIG. 8c.

Figure 8D:
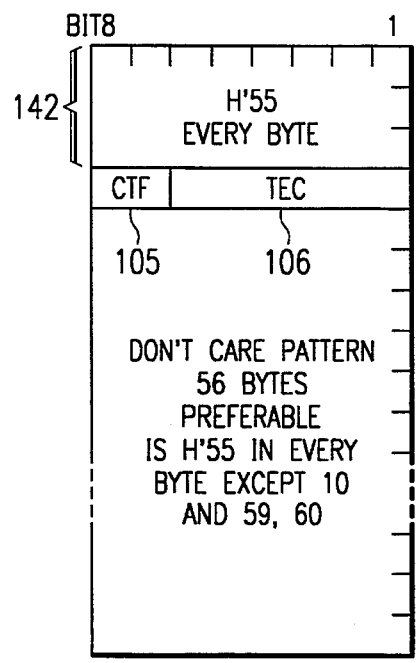
FIG. 8d is a byte map of an idle cell as it is sent in each direction over the switchcore interface (SCI)
Figure 8D:
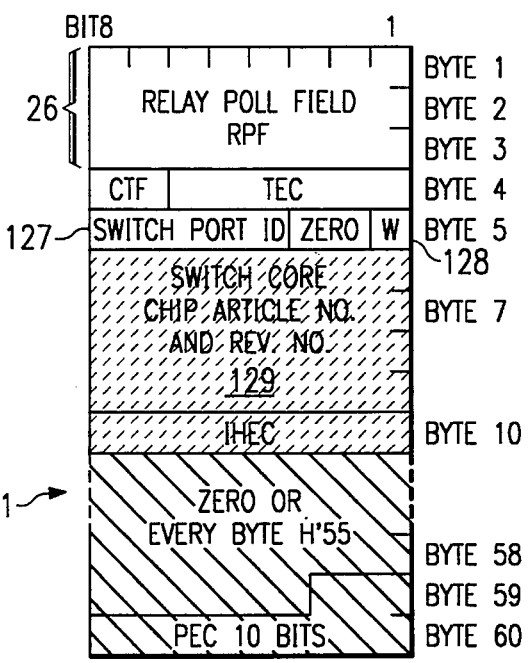

FIG. 8d is a byte map of an idle cell 141 as it is sent in each direction over the SCI. The idle cell 141 is identical to the maintenance cell 121 except that the first three bytes 142 of the idle cell 141 in the sending direction (switchport to switchcore) has no significance.

Figure 9:
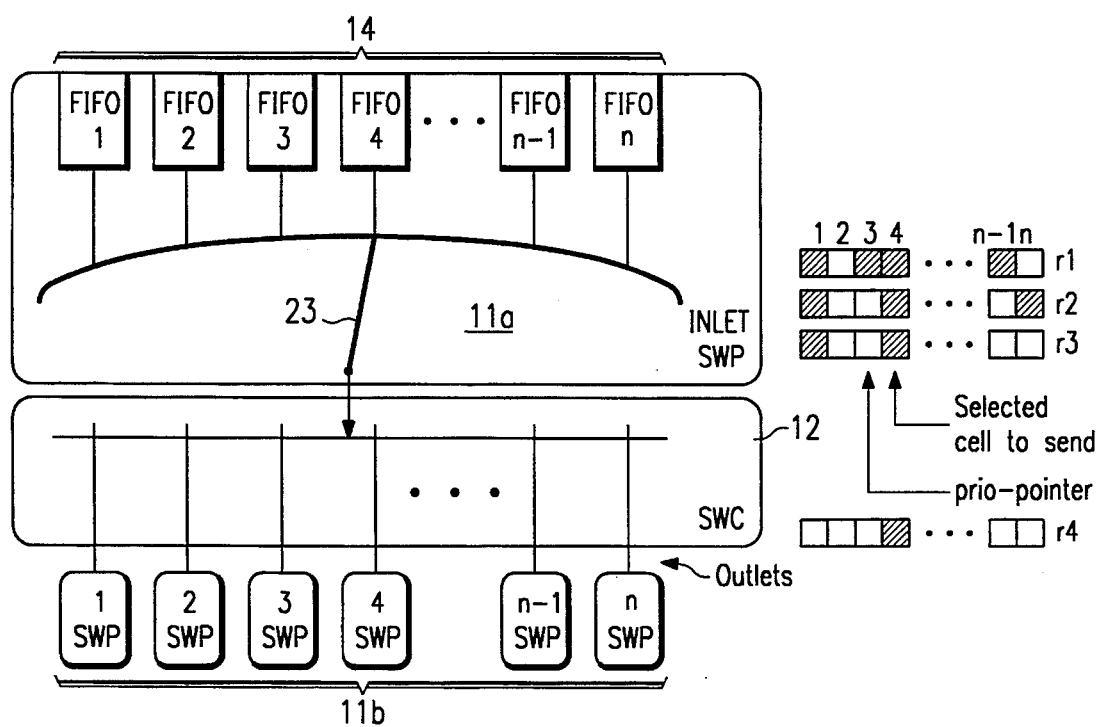
FIG. 9 is a simplified block diagram illustrating an embodiment of the controlled access ATM switch of the present invention in which there are an equal number of logic buffers in the input switchport and outlets for target switchports from the switchcore matrix.

FIG. 9 is a simplified block diagram illustrating an embodiment of the controlled access ATM switch of the present invention in which there are an equal number of logic buffers 14 in the input switchport 11a, and outlets for target switchports 11b from the switchcore matrix 12. The switchcore matrix 12 has the same number of outputs as the number of physical switchports 11b that can be connected. The input logic buffers 14 store and retrieve information on a first-in, first-out (FIFO) basis, and are labeled "FIFO 1" through "FIFO n" in FIG. 9. Each buffer 14 is physically mapped on its corresponding switchport 11.

In the case of register one (r1), mapping is effected from a logic buffer number to a physical buffer number. This means, for example, that buffer n−1 (FIFO n−1) will land in r1, position n−1, and FIFO n will land in r1, position n. In FIG. 9, a one (1) has been shown crosshatched and indicates that an information cell is currently in the buffer 14. Positions in r1 for which the corresponding buffer is empty are indicated by a zero (0), and are shown in white.

Register r2 contains the latest status of the receivers (target switchports) 11b on the other side of the switchcore 12, i.e., the content of RPF 26. Each bit position represents a target switchport 11b. A one (1), shown crosshatched, indicates that the target switchport 11b is free, and a zero (0), shown in white, indicates it is occupied. By making "r3=r1 AND r2", the sum of buffers 14 which have cells to send, and have target switchports 11b which can receive, is listed in r3.

In order to utilize the switching capacity of the access controlled ATM switching system of the present invention to 100 percent and, at the same time, ensure that a buffer cannot be totally excluded, a rotary priority indicator is included. FIG. 9 illustrates a stepping priority pointer 23 which locks firmly onto a buffer 14 that is waiting to transmit. The pointer 23 may, for example, lock onto FIFO 3 which is waiting to transmit, but will not be expedited on this transmission since its corresponding target switchport 11b is occupied. A cell is therefore taken from FIFO 1, which is pointed out through a priority decoder (for example, a "Left Most One" circuit), giving a mask before r3 is loaded to r4. After masking, r4 will thus indicate the cell to be transmitted. At the same time, r4 becomes the content of RAF 25 in the transmitted cell.

The aforesaid is only one illustrative embodiment of a method for structuring buffers and analyzing which cell to transmit next, and other methods may be implemented. The illustrated method can be performed within a period of one microsecond with some simple operation in, for example, a risc-processor. With the aid of specific hardware, an analysis speed of less than 200 nanoseconds is possible.

Figure 10:
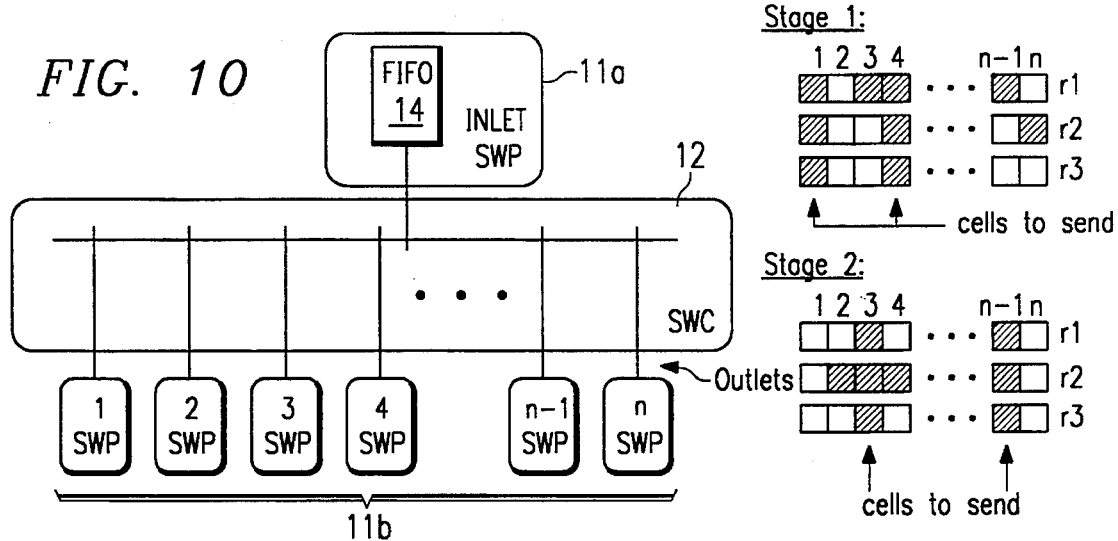
FIG. 10 is a simplified block diagram of an embodiment of the controlled access ATM switch of the present invention in which a single logic buffer is used for all switchcore outlets to target switchports.

FIG. 10 is a simplified block diagram of an embodiment of the controlled access ATM switch of the present invention in which a single logic buffer 14 is used for all switchcore outlets to target switchports 11b. In many applications such as Switched Multi megabit Data Service (SMDS), a single input buffer 14 will suffice, irrespective of the addressed output on the other side of the switchcore 12. In SMDS, the main traffic always passes from one switchport 11 to another for the capacity-critical paths when concentrating from several accesses to a server.

The single buffer 14 may address a single target switchport 11b, or it may group-address several target switchports 11b. A simple two-stage process for group-addressing is shown in FIG. 10. In stage 1, register r1 indicates, crosshatched, the target switchports 11b to which a cell in the buffer 14 is to be sent, in this example, switchports 1, 3, 4, and n−1. Register r2 indicates, crosshatched, the target switchports 11b that are free to receive the next cell (RPF 26), in this example, switchports 1, 4, and n. Register r3 results from the operation "r3=r1 AND r2" and thus indicates the target switchports 11b to be addressed (RAF 25) in stage 1, in this example, switchports 1 and 4.

In stage two, all remaining group addressees (switchports 3 and n−1) are expedited, as shown in black in register r1. Register r2 again illustrates which target switchports 11b are free to receive (2, 3, 4, and n−1). After the operation "r3=r1 AND r2", register r3 shows that cells are to be sent to target switchports 3 and n−1. If target switchports 3 and/or n−1 are not free, the procedure is repeated until the cell has been passed to all of the group addressees.

Figure 11:
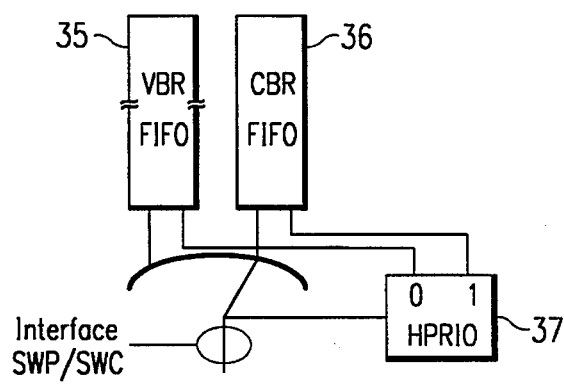
FIG. 11 is a simplified block diagram illustrating buffer prioritizing and the use of variable buffer sizes in the input side of the switchports of the controlled access ATM switch of the present invention.

FIG. 11 is a simplified block diagram illustrating buffer prioritizing and the use of variable buffer sizes in the input side of the switchports 11A of the controlled access ATM switch of the present invention. Buffers 14 of differing capacities can be utilized, depending on the type of communications traffic concerned. FIG. 11 illustrates the differing buffer sizes between a buffer for Variable Bit Rate (VBR) traffic 35 and a buffer for Constant Bit Rate (CBR) traffic 36, where CBR traffic has been assumed to require less buffer capacity.

FIG. 11 also illustrates that a method for prioritizing the information from each buffer may also be implemented in the ATM switch 10. The high priority (HPRIO) block 37 represents a method to, for example, provide higher priority for the information from the CBR buffer 36. The buffering and prioritizing functions are fully implemented in the input side of the switchports 11A, and are optimized for the type of communications service concerned.

Figure 12:
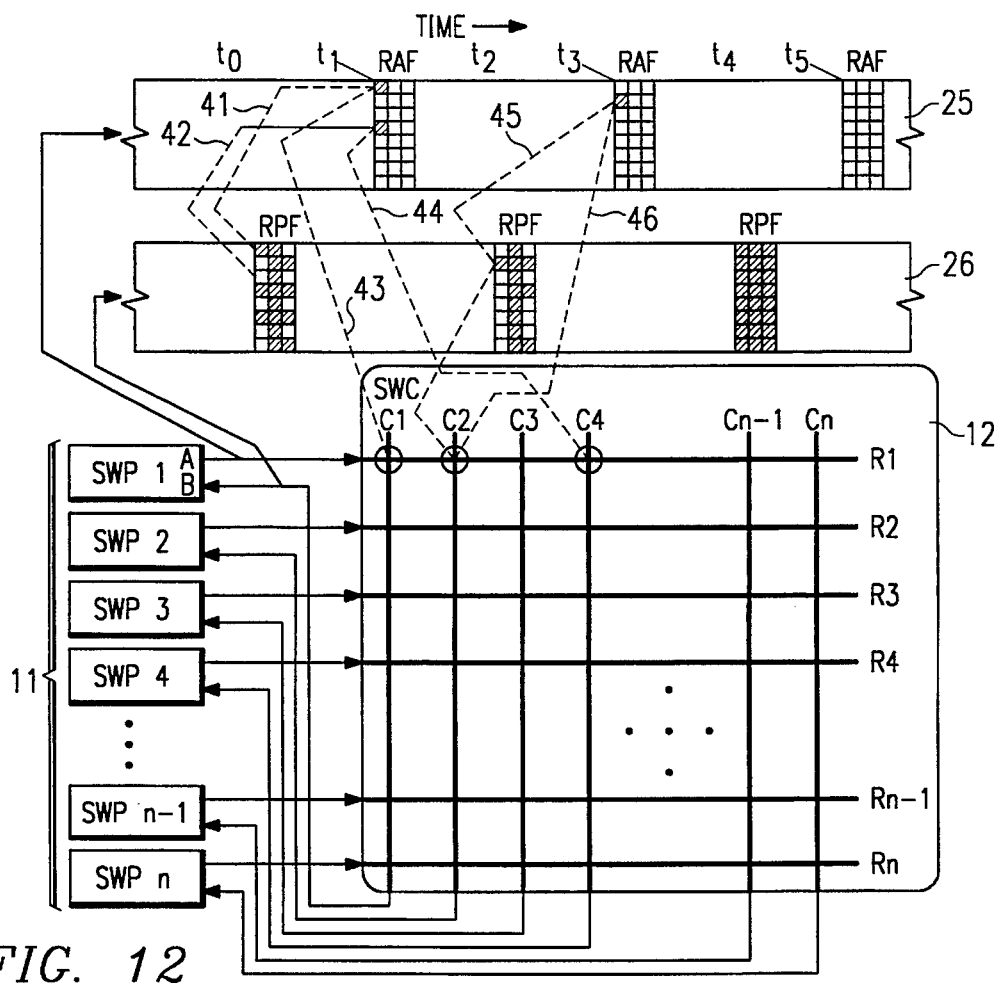
FIG. 12 is a functional diagram showing the connection of the switchports to the switchcore and illustrating the principle employed for the access mechanism to the switch matrix in the controlled access ATM switch of the present invention.

FIG. 12 is a functional diagram illustrating the connection of the switchports 11 to the switchcore 12 and the principle employed within the access mechanism to the switch matrix in the controlled access ATM switch of the present invention. The switchcore 12 is comprised of a switch matrix represented in FIG. 12 as rows R1 through Rn and columns C1 through Cn. The rows represent inputs from input switchports 11a, and the columns represent outputs to target switchports 11b. At the points in the switch matrix where the row number and column number are equal, the input side of the corresponding switchport 11A will transmit a cell to its own output side 11B. For example, at the intersection of row 1 and column 1, the input side 11A of switchport (SWP) 1 transmits cells to row 1, and column 1 then transmits the cell in column 1 to the output side 11B of switchport 1.

The connection of the switchports 11 to the switchcore 12 and the principle employed within the access mechanism is based on phase shifting of incoming and outgoing cells. The extent of the phase shift depends on the length of time taken to process and assemble RAF 25 and RPF 26 using the method illustrated in FIGS. 9 and 10. Possible series/parallel conversions may also take time.

FIG. 12 also illustrates how RAF 25 and RPF 26 can appear to the first switchport (SWP 1) at different times. At time $t_0$, SWP 1 receives RPF 26 which identifies all target switchports 11b which are free to receive cells. The switchport then compares the RPF 26 with the incoming RAF 25 which identifies which target switchports 11b are addressed by the cell in the SWP 1 buffer 14. This comparison consists of a simple AND function, and is illustrated in FIG. 12 by dotted lines 41 and 42. This comparison is completed at time $t_1$, and identifies target switchports 1 and 4. SWP 1 transmits the addressed cell to row R1, and to columns 1 and 4 which correspond to those target switchports 11b to which the cell can be sent, in this example, SWPs 1 and 4. This transmission is illustrated in FIG. 12 by the dotted lines 43 and 44 leading from the RAF 25 to positions R1, C1 and R1, C4 in the switch matrix.

The next RPF 26 arrives at time $t_2$, and indicates that target switchport SWP 2 is free. SWP 1 then compares the RPF 26 to the incoming RAF 25 which indicates that SWP 2 is addressed by the cell in the SWP 1 buffer 14. This comparison is illustrated by dotted line 45, and is completed at time $t_3$ when the cell is transmitted to position R1, C2, the position corresponding to SWP 2. This transmission is illustrated by dotted line 46 leading from the RAF 25 to position R1, C2 in the switch matrix.

At time $t_4$, RPF 26 indicates that all target switchports 11b are free to receive cells. However, at time $t_5$, the incoming RAF 25 indicates that SWP 1 has no addressed cells to send, and therefore, the AND comparison results in no cells being transmitted.

Figure 13:
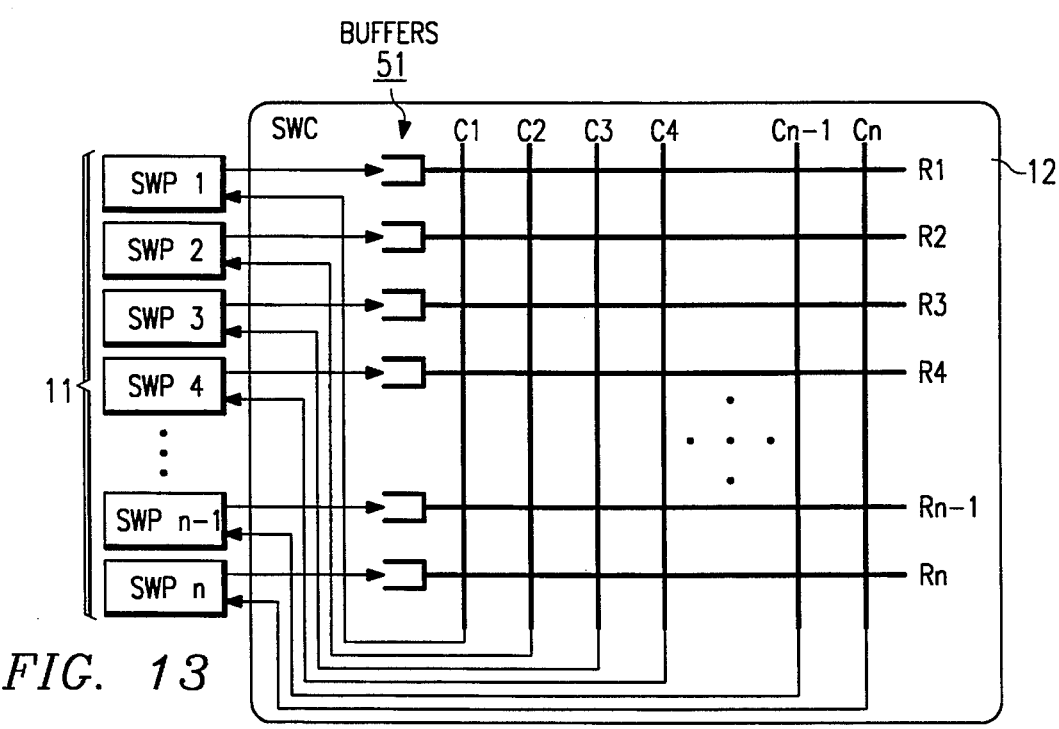
FIG. 13 is a functional diagram illustrating a minimal solution for the positioning of buffers in the switchcore matrix which still provides the desired functionality of the controlled access ATM switch of the present invention.

As noted above, the switchcore matrix 12 has a buffer depth of only one store for each path or route. The buffers in the switchcore 12 may be implemented in one of several ways, ranging from a minimal solution to a complete solution with a buffer at each crosspoint of the matrix. FIG. 13 is a functional diagram illustrating a minimal solution for the positioning of buffers 51 in the switchcore matrix 12 which still provides the desired functionality of the controlled access ATM switch of the present invention. Even this minimal solution, however, provides sufficient switch performance for services such as Switched Multimegabit Data Service (SMDS).

The minimal solution of FIG. 13 provides a "pool" of common buffers at the input of the switchcore 12. Provided that a buffer 51 is free, the switchcore 12 will signal the corresponding switchport 11 that the switchcore 12 is able to receive a new cell. Each block 51 in FIG. 13 represents from one to twelve buffers organized as a shared pool of buffers. The number of buffers 51 may vary, but twelve is the useful maximum because the peripheral logic grows to such an extent that, for more than twelve buffers 51, it becomes more economical to spread the buffers on each crosspoint of the matrix. The common buffer pool may also be distributed across the switchcore matrix 12 to those crosspoints which are used most often.

Figure 14:
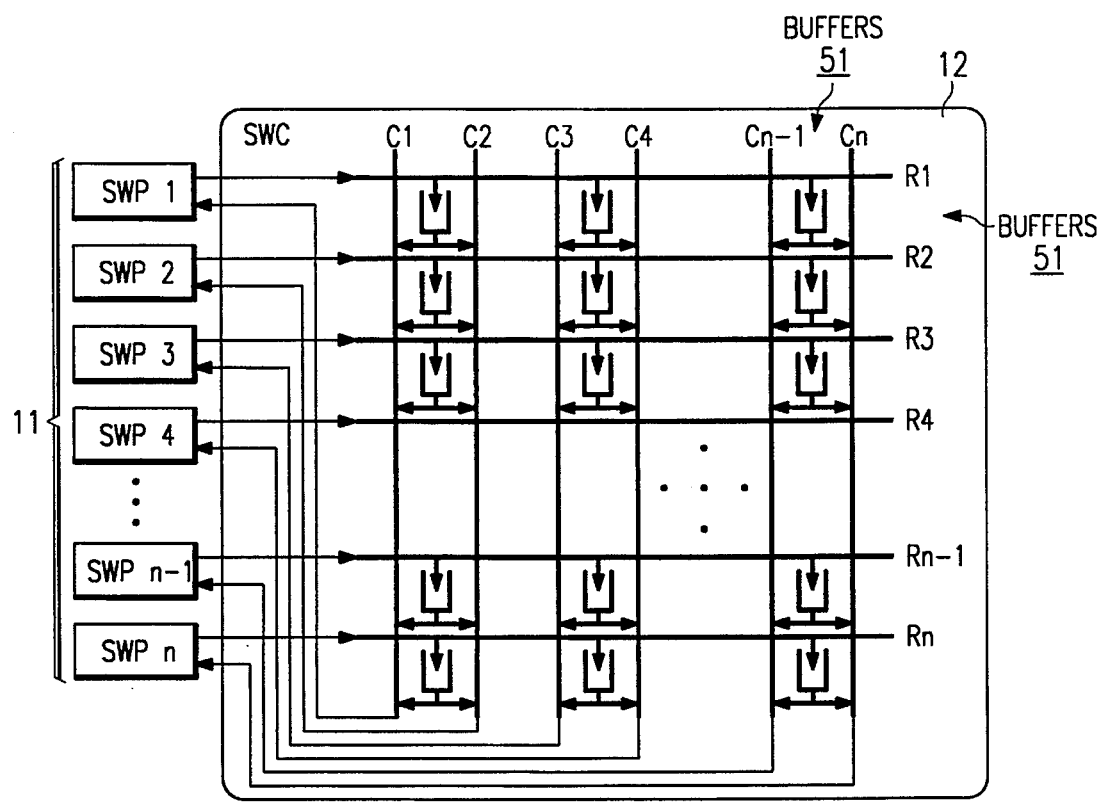
FIG. 14 is a functional diagram illustrating the positioning of buffers in the switchcore matrix when an intermediate number of buffers are employed in the controlled access ATM switch of the present invention.

FIG. 14 is a functional diagram illustrating the position of buffers 51 in the switchcore matrix 12 when an intermediate number of buffers are employed in the controlled access ATM switch of the present invention. FIG. 14 illustrates a solution in which each buffer 51 is shared by two crosspoints in the matrix 12, but other divisions are also possible within the scope of the present invention.

Figure 15:
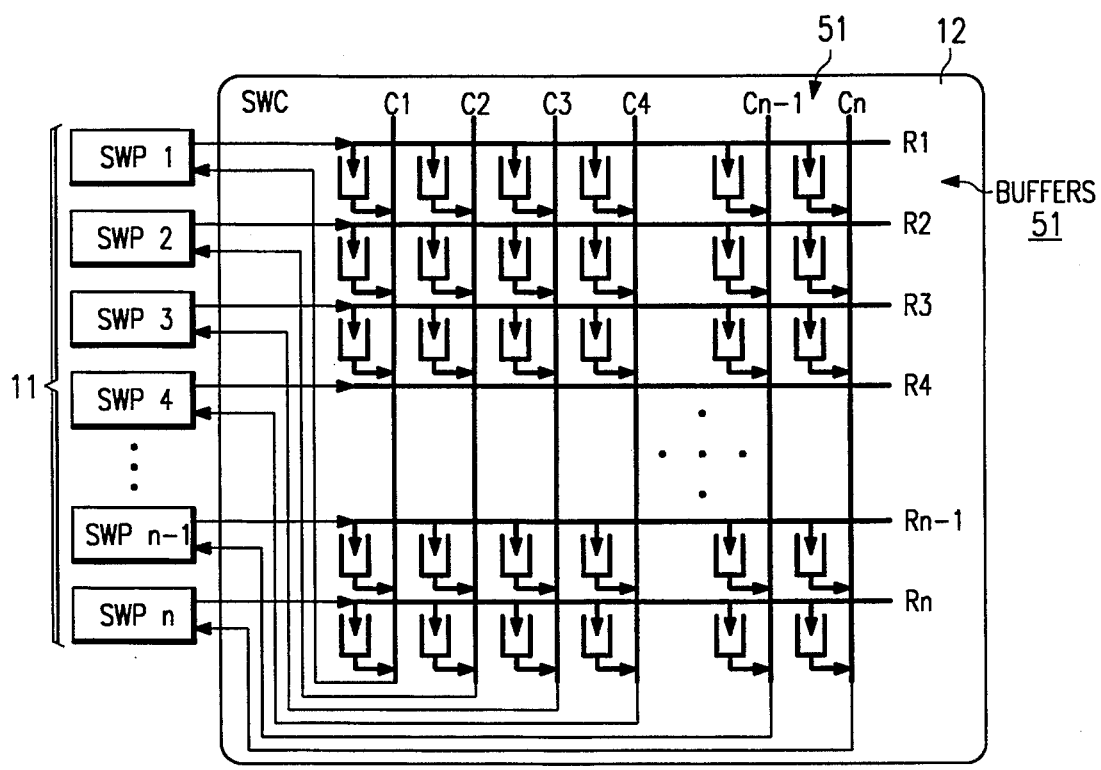
FIG. 15 is a functional diagram illustrating the positioning of buffers in the switchcore matrix in a complete solution in which one buffer, one cell deep, is used for each matrix cross-point in the controlled access ATM switch of the present invention.

FIG. 15 is a functional diagram illustrating the position of buffers 51 in the switchcore matrix 12 in a complete solution in which one buffer, one cell deep, is used for each matrix cross-point in the controlled access ATM switch of the present invention. Other solutions are possible, depending on chip layout and other physical limitation, and remain within the scope of the present invention. In one embodiment, a 20×20 matrix 12 and one buffer 51 for each crosspoint results in an approximate memory capacity of 179,200 bits, divided on 400 buffers of 56×8.

Figure 16:
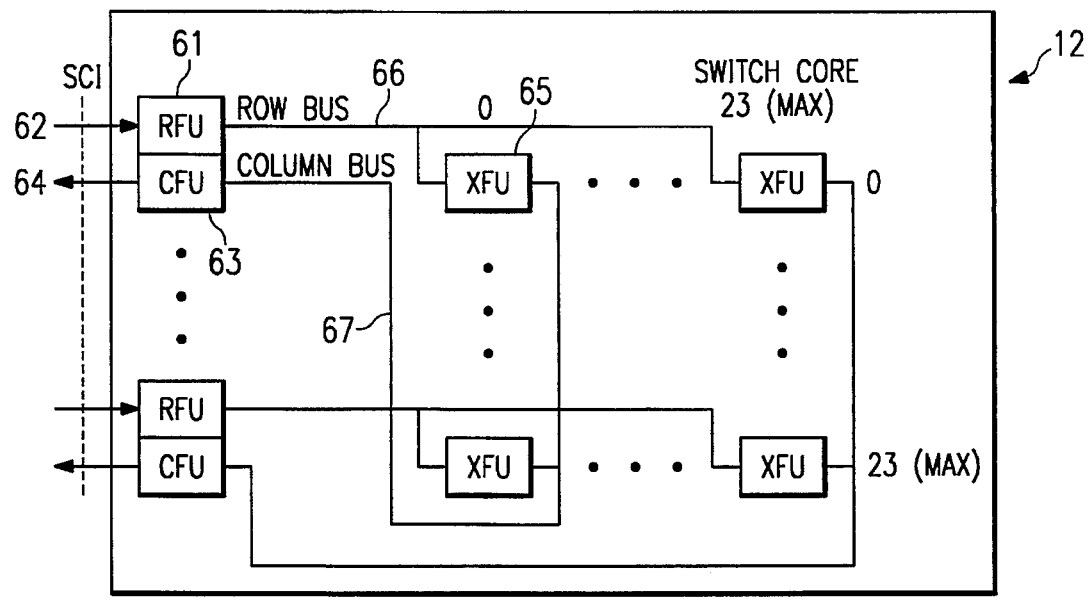
FIG. 16 is a high level block diagram of a switchcore matrix.

FIG. 16 is a high level block diagram of a switchcore matrix 12. The switchcore 12 comprises three basic units for each switchport, i.e., 24 of each unit in the preferred embodiment. On a per-switchport basis, a row function unit (RFU) 61 terminates the incoming cell stream 62. A column function unit (CFU) 63 forms a synchronized pair with the RFU 61, and generates the outgoing cell stream 64. A cross function unit (XFU) 65 receives information cells 111 (FIG.

8a) from the RFU 61 via the row bus 66 and relays the information cells through the switchcore 12. The RFU 61 throws away idle cells 141 (FIG. 8d), and decodes and executes maintenance cells 121 (FIG. 8c).

Each CFU 63 searches the XFUs 65 attached to the CFU for cells to be relayed, and extracts those cells via a column bus 67. If no cells are found, the the CFU 63 generates an idle cell 141 which is transmitted to the attached switchport 11. If an incoming maintenance cell 121 is detected, then the stated command is executed and an acknowledgement is sent to the switchport 11. If any field is out of range, an error acknowledgement will be sent instead.

Each XFU 65 stores an addressed cell, and sets a flag indicating that a cell is waiting to be unloaded by the CFU 63.

Figure 17:
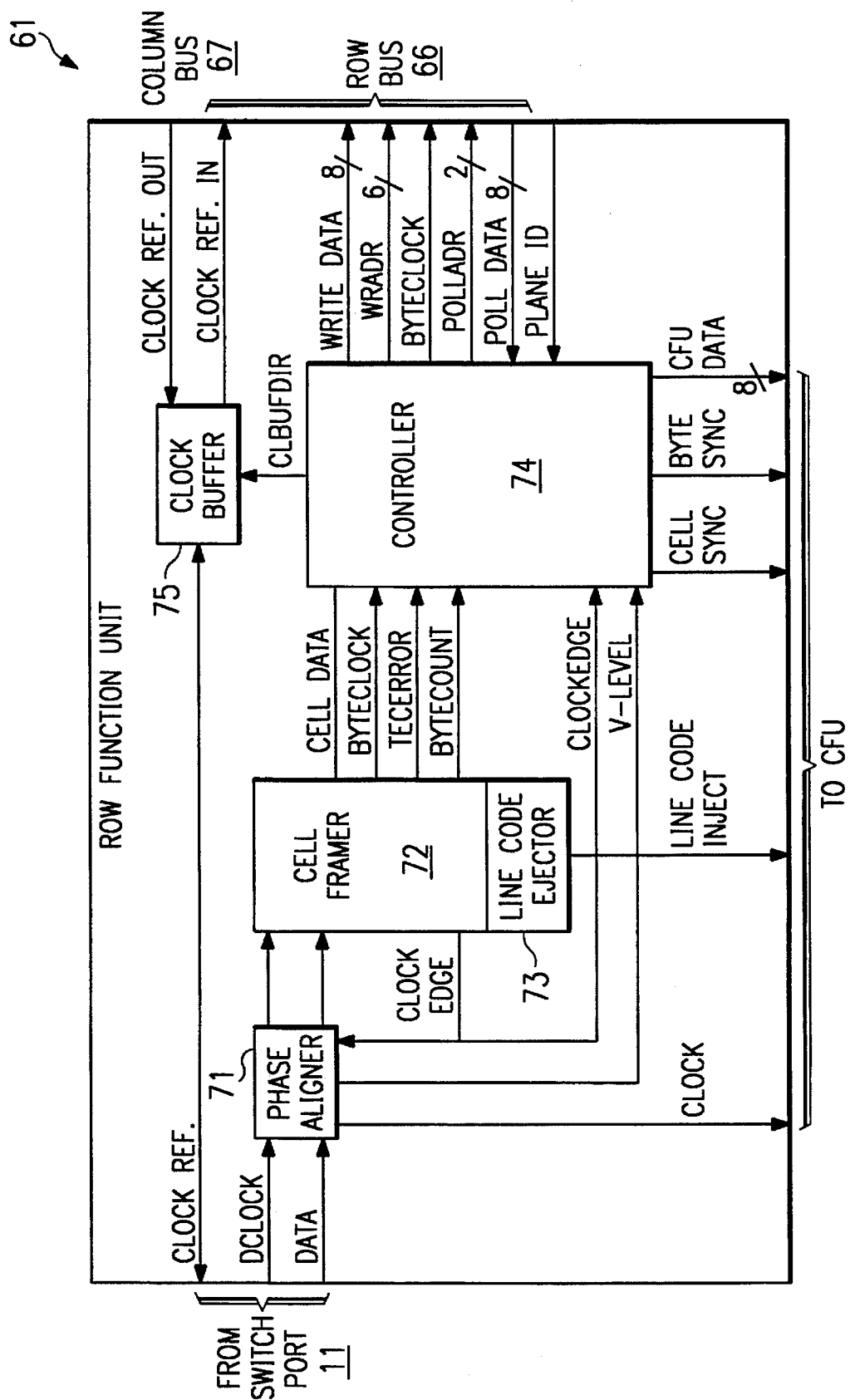
FIG. 17 is a block diagram of a row function unit (RFU) of the switchcore matrix.

FIG. 17 is a block diagram of a row function unit (RFU) 61 of the switchcore matrix 12. It can be seen that the RFU 61 interfaces with the switchport 11, the column bus 67 and row bus 66, and the CFU 63. A phase aligner 71 adapts to the incoming bit rate that may vary from a very low speed (a few bit/s) up to the technology limit which may be approximately 200 Mbit/s, and aligns the incoming bit rate with the incoming clock. A cell framer 72 performs the function of converting the incoming bitstream into byte format and finding the start of a cell in order to synchronize the other internal units in the RFU 61 as well as the associated CFU 63 and all XFUs 65 attached to the RFU-CFU pair. The RFU 61 uses the tag error check (TEC) 106 in order to find the start of the cell. A line code ejector 73 may comprise a 5-bit modulo 25 counter that removes a line code polarity bit from the data stream by prolonging every third byte with the time of the line code bit. A RFU controller 74 derives the plane select field (PLSF) 124 (FIG. 8c), the operation request field (ORF) 125, and the cell type field (CTF) 105 and stores their values at the times they are present on the cell data bus. At designated times, the PLSF 124, ORF 125, and CTF 105 are sent over the row bus 66 to the CFU 63. The clock buffer 75 is a bidirectional buffer controlled by the RFU controller 74.

Figure 18:
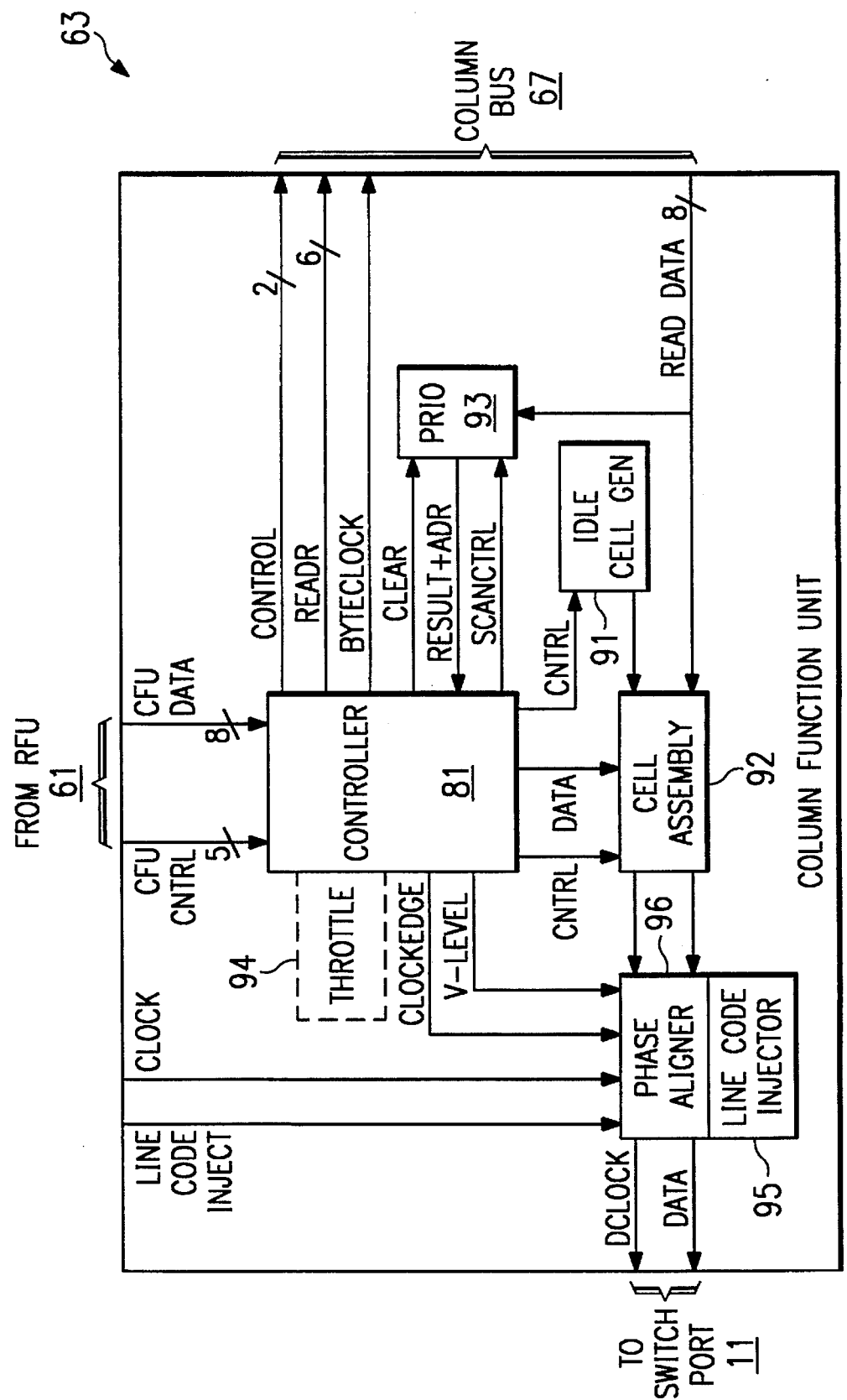
FIG. 18 is a block diagram of a column function unit (CFU) within the switchcore matrix.

FIG. 18 is a block diagram of a column function unit (CFU) 63 within the switchcore matrix 12. The CFU 63 interfaces with the column bus 67 (FIG. 16), with the RFU 61, and with the switchport 11. When the CFU 63 receives a cell-sync signal from the RFU 61, indicating that a cell addressed to that CFU has been sent to a cross function unit (XFU) 65, the CFU 63 unloads the cell from the XFU 65 via the column bus 67. If there is no cell, the CFU 63 generates an idle cell 141 (FIG. 8d). If the RFU 61 indicates that a maintenance cell 121 (FIG. 8c) has been sent, the CFU 63 generates a maintenance cell 121. The unloaded cell, the idle cell, or the maintenance cell is added to the relay poll field (RPF) 26 and sent to the switchport 11 along with a clock signal indicating a valid bit.

Figure 19:
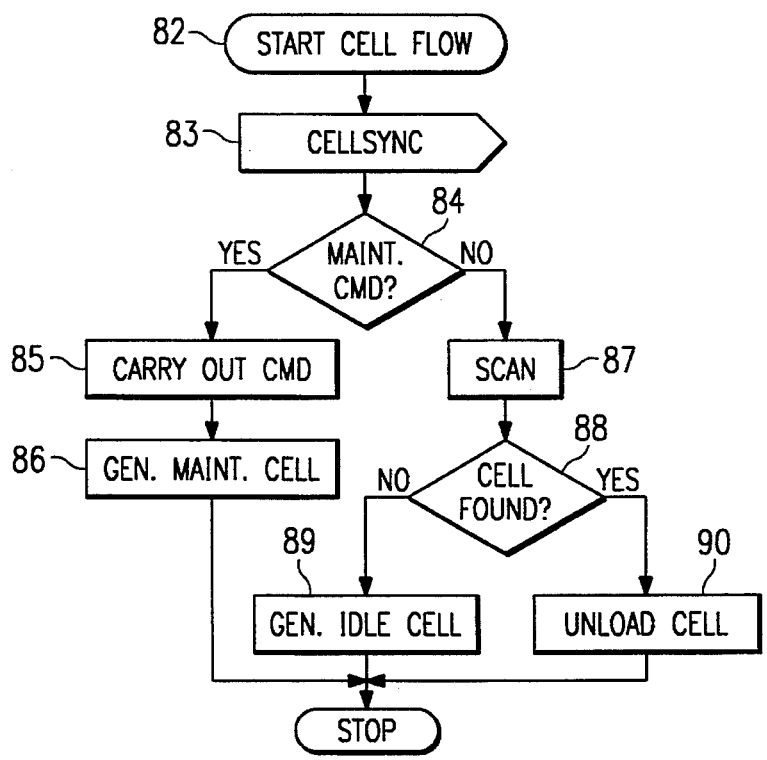
FIG. 19 is a high level flow chart of a software program which controls the functions of a CFU controller within the column function unit (CFU)

A CFU controller 81 controls the actions of the CFU 63. FIG. 19 is a high level flow chart of the software program which controls the functions of the CFU controller 81. The program is entered at step 82 when the flow of cells begins. At step 83, the CFU 63 receives a cellsync indication from the RFU 61 indicating that a cell has been received which is addressed to the CFU 63. At step 84, it is determined whether or not a maintenance command is present. If a maintenance command is present, the program moves to step 85 where the CFU 63 carries out the maintenance command. At step 86, the CFU 63 generates a maintenance cell 121 (FIG. 8c). If, however, at step 84 it was determined that a maintenance command was not present, then the program moves to step 87 where a scan is performed in an attempt to retrieve a cell from the XFU 65. At step 88, it is determined whether or not a cell was found on the scan. If a cell was not found, the program moves to step 89 where an idle cell 141 is generated. If, however, at step 88 a cell was found, then the program moves to step 90 where the cell is unloaded from the XFU 65.

Referring again to FIG. 18, an idle cell generator 91 generates bits 5 to 60 of an outgoing idle and maintenance cell upon command from the CFU controller 81. A cell assembly device 92 assembles cells in the formats shown in FIGS. 8a–8d. The first three bytes are generally poll data, and the fourth byte conatins cell type field (CTF) 105 and tag error check (TEC) 106. All data in the first four bytes except the TEC 106 are only put in the byte stream by control signals from the CFU controller 81. In addition, the payload 103 is loaded, which may be an idle or maintenance pattern or an information cell unloaded from an XFU 65. A delay line of 8 bytes is inserted in front of the payload 103 for a late arriving poll result.

A priority device 93 supports the CFU controller 81 by storing the results of scans when the CFU 63 scans XFUs 65 for loaded cells. The priority device 93 indicates a found cell and provides the CFU controller 81 with the selected XFU address. If the scan result is negative, i.e., there were no cells to relay, a miss is indicated to the CFU controller 81.

A throttle device 94 is shown in phantom in FIG. 18, and is an optional device. The throttle device may be, for example, a settleable modulo counter of 5 bits. It allows a connected switchport 11 to get a much lower logical throughput than the actual physical rate allows.

A CFU line code ejector 95 inserts a line code bit every 25th bit when so indicated by the RFU 61. A CFU phase aligner 96 adapts to the same clock and levels as the RFU phase aligner 71 (FIG. 17). In addition, the CFU phase aligner 96 converts parallel data to a serial bit stream.

Figure 20:
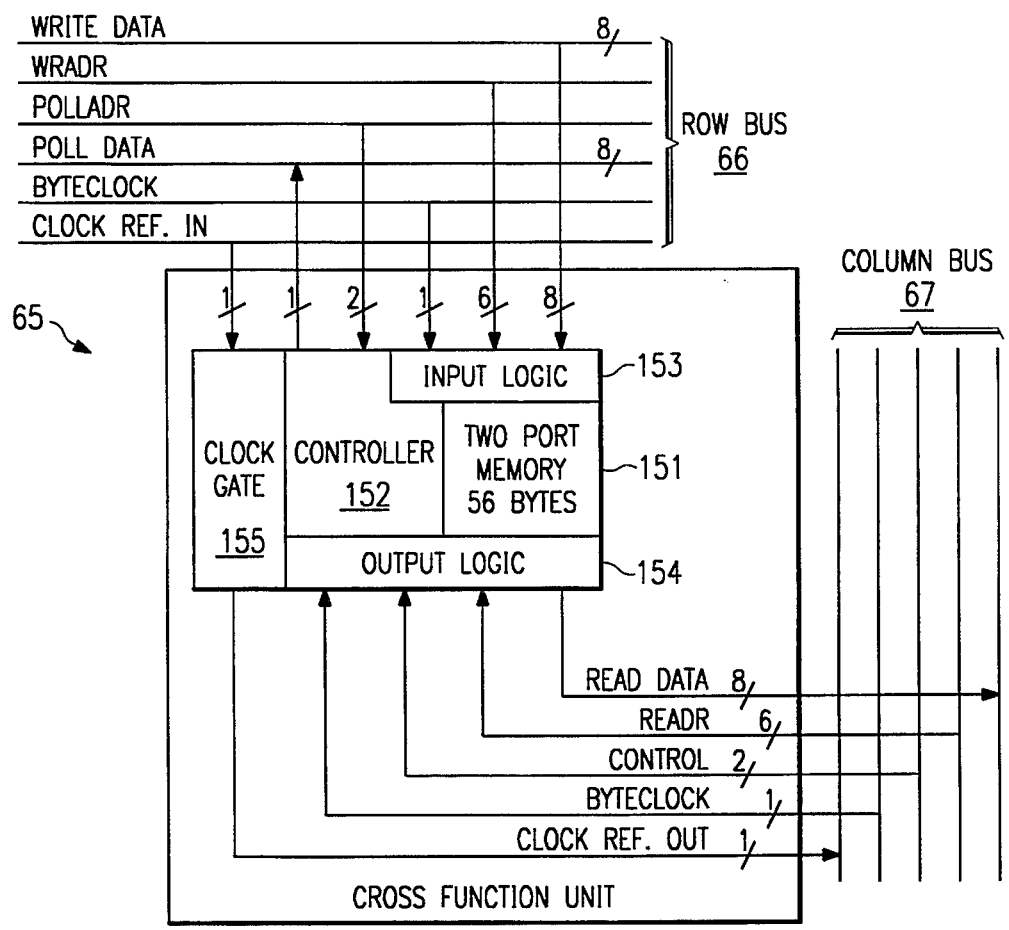
FIG. 20 is a block diagram of a cross function unit (XFU) within the switchcore matrix.

FIG. 20 is a block diagram of a cross function unit (XFU) 65 within the switchcore matrix 12. The XFU 65 interfaces with the row bus 66 and the column bus 67 (FIG. 16). The cells on the row bus 66 are written into an XFU memory device 151 when the relay address field (RAF) 25 matches the XFU row address. The cells are unloaded from the XFU 65 onto the column bus 67 if the XFU in question is addressed. In addition, current XFU status is read by polling the row bus 66. Current XFU status can be read by scanning from the CFU 63.

The XFU 65 is controlled by an XFU controller 152 which decodes incoming signals from the RFU 61 on the row bus 66, and incoming signals from the CFU 63 on the column bus 67. An input logic device 153 analyzes the 24-bit relay address field (RAF) 25 in incoming cells on the row bus 66 to determine if the XFU in question is addressed. An output logic device 154 determines when the XFU 65 is addressed by control lines on the column bus 67. A clock gate device 155 consists of one flip-flop and a gate that is enabled by the flip-flop. The flip-flop is in a reset state, and the clock gate is disabled, at power up.

The XFU memory device 151 may be a two-port memory implemented as a register file with three state outputs. This implementation is consistent with a gate-array embodiment of the switchcore matrix 12.

Figure 21:
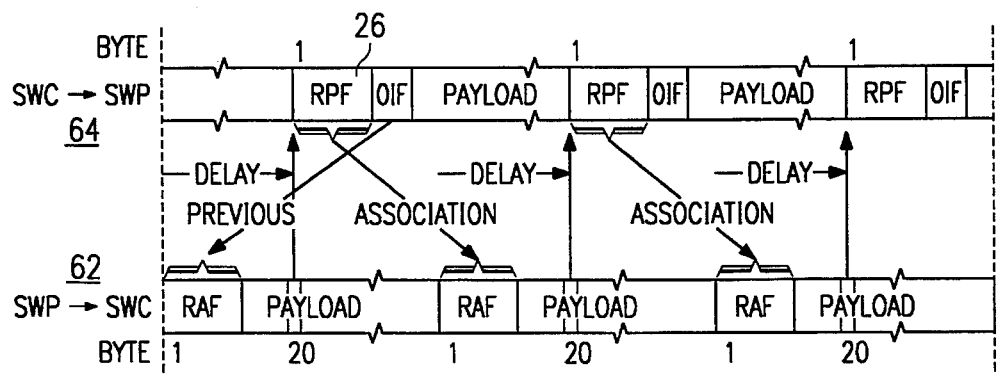
FIG. 21 illustrates the timing relationship between the switchport-to-switchcore cell stream and the switchcore-to-switchport cell stream within the switchcore interface (SCI) for a specific switchport.

FIG. 21 illustrates the timing relationship between the switchport-to-switchcore cell stream and the switchcore-to-switchport cell stream within the switchcore interface (SCI) for a specific switchport 11. In FIG. 21, and the preferred embodiment, the two streams of cells are synchronized at byte 20 of the SWP-to-SWC stream 62. The processing time in the switchcore 12 sets the actual synchronization time and varies for different switchcore embodiments. The SWC-to-SWP stream 64 follows the SWP-to-SWC stream 62 by a time period sufficient for the switchport 11 to analyze the RPF field 26 and determine if the next cell can be addressed to the targeted switchport, and thereby construct the RAF 25 for the next cell. The time period for the switchport to perform this analysis and send the next cell is indicated by the "association" arrow in FIG. 21, and in the preferred embodiment, is the time it takes to transmit 40 bytes. The "delay" arrow indicates the delay which may be set by the delay command in the operation request field (ORF) 125 (FIG. 8c). The "previous" arrow indicates the relationship between the operation indication field (OIF) 126 (FIG. 8c) and the RAF 25 of the previous SWP-to-SWC cell. The OIF 126 indicates whether the previous cell had an error, or in case of a maintenance cell to the switchcore 12, whether or not it was carried out.

A clock reference signal is generated through the SCI in order to achieve cell synchronization (cell-sync). In the preferred embodiment, the switchports 11 are synchronized so that their cell starts fall within a window corresponding to the time it takes to transmit two bytes in order to utilize the full throughput. An additional time period corresponding to the time to transmit approximately one bit is added to the window to account for clock reference jitter. The system also allows for an additional half-byte time period for internal jitter in the switchcore 12.

Redundancy may be added to the ATM switch 10 of the present invention in several ways. For example, a second plane 13 may be added to the switchcore 12 as shown in FIG. 1. The planes 12 and 13 may be mutually asynchronous, depending on the difficulty of synchronizing the switch with possible loss of a cell in the switchcore 12. Adding an asynchronous plane 13 adds to the expense and complexity of the switchport 11 because the switchport 11 must be made more intelligent with several measuring algorithms.

Figure 22:
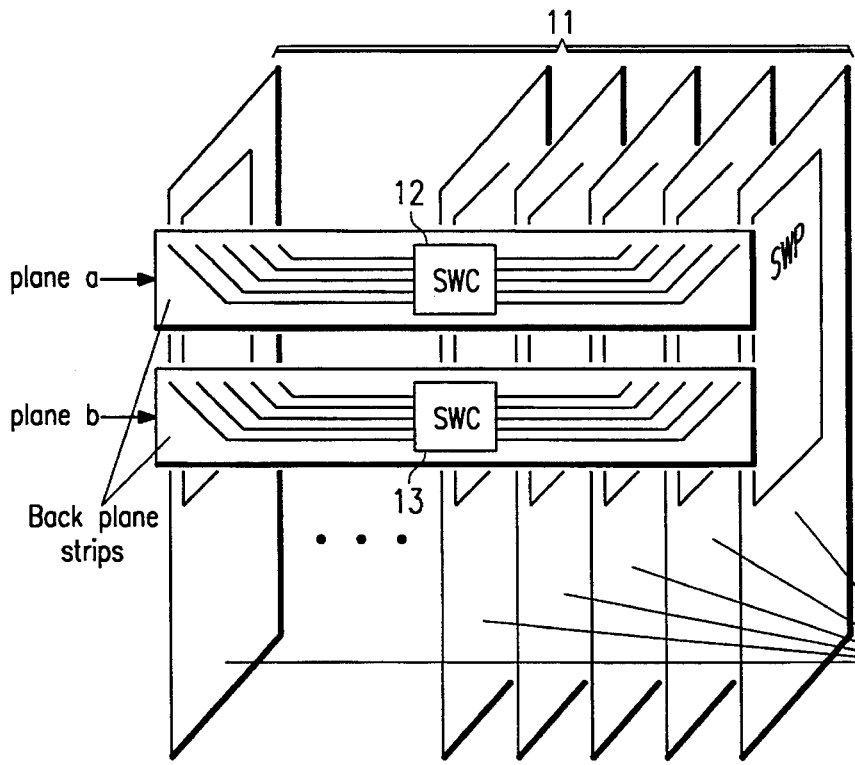
FIG. 22 is a perspective view of one embodiment of the controlled access ATM switch of the present invention in which a single-chip switchcore is mounted on a back plane to which switchport boards are connected.

The switchcore 12 of the controlled access ATM switch 10 of the present invention may be constructed on a single chip which has the capacity for 20 double-directed 155-Mbit connections, the buffers 51, and remaining switchcore functions. Such a single-chip switchcore 12 may be mounted directly on a back plane which is not much wider than the ATM switch 10 itself. FIG. 22 is a perspective view of one embodiment of the controlled access ATM switch 10 of the present invention in which each single-chip switchcore plane 12 and 13 is mounted on respective back plane strips 161 and 162 to which switchport boards 11 are connected. The back plane strips 161 and 162 are replaceable, just as other circuit boards are replaceable. The back plane strips 161 and 162 need not be straight; they may also be curved or folded through 90° since only one switchcore is needed for connecting the switchport boards 11 on each strip.

If it is wished to maintain a lower level of technology, the switchcore 12 may be divided into three or four chips with a corresponding reduction in speed and required internal memory size. Conversely, four switchcore chips of 155-Mbit capacity may be link-coupled together in order to upgrade the switchcore to 620-Mbit capacity. Link-coupling requires the installation of switchports 11 between each switchcore 12. Therefore, for a number of link-coupled structures, the ATM switch 10 cannot be of plane-duplicated construction. From a reliability standpoint, this need not be a disadvantage. A plane-duplicated switch, in essence, is a switch with n+1 redundancy, where n=1. There are a number of link-coupled structures which provide n+1 redundancy, where n is greater than 1 in various stages of the structure.

Another advantage of the controlled access ATM switch 10 of the present invention is that the built-in access control supports the connection of different devices which operate at different physical speeds. The ATM switch of the present invention provides for total asychronous communications at any speed. Although the switchcore 12 may become slightly more complex and expensive as a result of this capability, benefits are obtained on the device (switchport) side which outweigh the additional switchcore expense and provide an improved overall cost profile.

Isochronal service through the switchcore 12 may be created by subordinating the ATM cells in a frame. With isochronal service, the controlled access ATM switch 10 of the present invention can handle both STM and ATM traffic, and may be used in multimedia terminals intended for such service as PABX and public access nodes.

Isochronal service is based on the ATM-cell format, although it is coupled through the switch 10 at a specific predetermined time relative to a subordinate 125-µs frame. Due to the clock distribution signal, a master device attached to a switchport 11 can send its 125-µs frame sync to slaved devices attached to other switchports. The devices then schedule their cells within the time frame given by the master. Thus, it is essential that no other time slot on the same column have requested isochronal output at the time at which the cell/time slot shall be read. Therefore, the switchports 11 must coordinate the scheduling of isochronal cells by, for example, a controlling administrator which distributes isochronal time slots on a column basis so that no cell collisions occur.

The administrator, which may be centralized or distributed, may also distribute isochronal time slots so that a minimum delay occurs in the switchcore 12, since the time spent by the cell in a switchcore buffer 51 wastes buffer resources. The smallest switching level is thus a cell, meaning that 3.6 Mbit is the lowest conceivable allocation bandwidth in a single frame structure then expediting isochronal service at a 125-µs frame level.

The switch 10 may also use a multi frame structure which obviates the need of "sacrificing" a full cell in those cases when the incoming bandwidth is longer than 125 µs. The frame or multiframe structure may be based either on a synchronization pattern in the data flow, or on a frame clock which may run, for example, at 8 Khz, or a combination of both. An 8-Khz clock may result in some jitter problems, but it will provide a less expensive hardware solution since it can be provided through the clock distribution.

For switching to a lower level than one cell, the controlled access ATM switch 10 may be equipped with a device which can switch 155-Mbit currents on a 64-kbit level (a 4/0 device). With a 4/0 device, the internal structure of the cells is dissolved, and bytes are moved between cells and are then transmitted in different directions.

A proposed standard for circuit emulation in an ATM-environment will probably eliminate the need for switching on the 64-kbit level when conversion to ATM occurs only once. The standard specifies that the ATM cell is allocated to a connection and is partially or fully filled with 64-kbit samples, thus making it pooossible to more efficiently utilize the switching capacity.

It should also be noted that the controlled access ATM switch 10 of the present invention will function very well in single-plane solutions by including error-discovery mechanisms in the cell as it is transferred through the switchcore 12 from one switchport 11 to another. Three additional bytes may be added for this purpose. This process would be difficult to achieve in a pure circuit switch without incurring greater expense. This capability renders the controlled access ATM switch 10 suitable as an access switch for multimedia applications.

Thus, where the present invention has been described in connection with the exemplary embodiments thereof, it can be understood that many modifications and variations will be apparent to those of ordinary skill in the art. The present disclosure and the following claims are intended to cover all such modifications and variations.

What is claimed is:

1. A data transfer switch comprising:

a switchcore matrix comprising a plurality of rows, columns, and crosspoints thereof, providing selectable routing paths for the routing of a stream of information cells from input points to output points on s aid matrix;

means for interfacing between external information cell communications devices and said switchcore matrix, said interfacing means comprising:

a plurality of input switchports electronically connected to said switchcore matrix at said input points, each of said input switchports including at least one input buffer and being associated with one of said matrix rows;

a plurality of output switchports electronically connected to said switching matrix at said output points, each of said output switchports being associated with one of said matrix columns; and means for asynchronously transmitting and receiving said stream of information cells from said switchcore matrix;

a plurality of single-cell buffers, each of said single-cell buffers being located at a different one of said crosspoints of said switchcore matrix;

means for reporting to each of said input switchports whether each of said single-cell crosspoint buffers on said input switchport's associated row contains an information cell; and means for controlling access by said information cells to said switchcore matrix by holding said information cells in said input buffers until one of said single-cell crosspoint buffers is empty.

2. The data switch of claim 1 wherein each of said switchports includes the same number of said input buffers as there are output points from said switchcore matrix.

3. The data switch of claim 1 wherein each of said input buffers is selectively sized for the type of communications traffic to be transmitted through said buffer.

4. The data switch of claim 3 wherein said switch is an asynchronous transfer mode (ATM) switch and said means for controlling access to said switchcore matrix includes an ATM space switching protocol which translates logic addresses from said switchports to physical addresses in said switchcore matrix.

5. The ATM switch of claim 4 wherein said ATM space switching protocol includes:

a relay address field for identifying target switchports to which each of said information cells is addressed;

a relay poll field for identifying which of said target switchports are free;

means for comparing said relay address field and said relay poll field to identify which of said target switchports are both addressed and free; and means for transmitting each of said information cells to said addressed target switchports that are free.

6. The ATM switch of claim 5 wherein the means for transmitting said information cells includes means for establishing priority among said information cells such that cells with the highest priority are transmitted first.

7. The ATM switch of claim 5 wherein the means for transmitting said information cells includes means for independently delaying transmission of selected ones of said information cells to synchronize said transmission with the transmission of other identified information cells to provide isochronal service.

8. The ATM switch of claim 5 wherein the means for transmitting said information cells includes a totally asynchronous interface between said switchports and said switchcore for enabling each of said external communications devices to operate at an optimum data rate.

9. An ATM switch comprising:

a switchcore matrix comprising a plurality of rows columns, and crosspoints thereof, providing selectable routing paths for the routing of a stream of information cells from input points to output points on said matrix:

means for interfacing between external information cell communications devices and said switchcore matrix, said interfacing means including a plurality of switchports electronically connected to said switchcore matrix at said input and output points, for asynchronously transmitting and receiving said stream of information cells from said switchcore matrix each of said switchports including at least one input buffer selectively sized for the type of communications traffic to be transmitted through said buffer; and means for controlling access by said information cells to said switchcore matrix comprising:

means for holding said information cells in said input buffer until one of said routing paths is available; and an ATM space switching protocol which translates logic addresses from said switchports to physical addresses in said switchcore matrix, said ATM space switching protocol comprising:

a relay address field for identifying target switchports to which each of said information cells is addressed;

a relay poll field for identifying which of said target switchports are free;

means for comparing said relay address field and said relay poll field to identify which of said target switchports are both addressed and free; and means for transmitting each of said information cells to said addressed target switchports that are free, said transmitting means comprising:

means for phase shifting incoming and outgoing information cells; and means for determining the extent of said phase shift by measuring the length of time required to process and assemble said relay address field and said relay poll field.

10. The ATM switch of claim 9 wherein the switchcore matrix includes one or more single-cell buffers for each of said routing paths.

11. The ATM switch of claim 10 wherein said switchcore matrix includes:

a plurality of row function units for terminating said information cell streams incoming from said switchports;

a plurality of column function units which form synchronized pairs with said row function units and generate said information cell streams outgoing to said switchports;

a plurality of cross function units for receiving said information cells from said row function units and relaying said information cells to said column function units; and a plurality of row buses and column buses for transmitting said information cell streams between said row function units and said column function units.

12. The ATM switch of claim 11 wherein said cross function unit includes a two-port memory device for storing said information cell until said information cell is unloaded by said column function unit.

13. The ATM switch of claim 12 wherein said cross function unit includes means for generating a flag signal for indicating to said column function unit that an information cell addressed to said column function unit is being stored in said two-port memory device.

14. The ATM switch of claim 13 wherein said switchcore matrix is constructed on a single integrated circuit.

15. The ATM switch of claim 14 wherein said switchcore matrix is mounted on a backplane to which said switchports are electrically connected.

16. The ATM switch of claim 10 wherein said single-cell buffers are arranged in pools of common buffers at said input points of said switchcore matrix.

17. The ATM switch of claim 16 wherein each of said pools of common buffers comprise a group of between one and twelve of said single-cell buffers.

18. The ATM switch of claim 17 wherein each of said pools of common buffers are distributed across said switchcore matrix to the crosspoints which are used most often.

19. The ATM switch of claim 10 wherein each of said single-cell buffers is shared by two of said crosspoints in said switchcore matrix.

20. The ATM switch of claim 10 wherein one of said single-cell buffers is located at each of said crosspoints of said switchcore matrix.

21. A data transfer switch comprising:

a plurality of switchcore matrices, each of said matrices comprising a plurality of rows, columns, and crosspoints thereof, providing selectable routing paths for the routing of information cells from input points to output points on said matrices; and means for interfacing between external information cell communications devices and said switchcore matrices, said interfacing means comprising:

a plurality of input switchports electronically connected to said switchcore matrices at said input points, each of said input switchports including at least one input buffer and being associated with one of said rows;

a plurality of output switchports electronically connected to said switchcore matrices at said output points, each of said output switchports being associated with one of said columns; and means for asynchronously transmitting and receiving said stream of information cells from said switchcore matrices;

a plurality of single-cell buffers, each of said single-cell buffers being located at a different one of said crosspoints of said switchcore matrices;

means for reporting to each of said input switchports whether each of said single-cell crosspoint buffers on said input switchport's associated row contains an information cell; and means for controlling access by said information cells to said switchcore matrices by holding said information cells in said input buffer until one of said single-cell crosspoint buffers is empty.

22. The data transfer switch of claim 21 wherein each of said switchcore matrices is constructed on a single integrated circuit.

23. A method for controlling the flow of information cells within a communications system comprising the steps of:

providing selectable routing paths for the routing of said information cells from input points to output points of a switchcore matrix having a plurality of rows, columns, and crosspoints thereof;

electronically connecting a plurality of input switchports to the input points of said switchcore matrix, each of said input switchports including at least one input buffer and being associated with one of said matrix rows;

electronically connecting a plurality of output switchports to the output points of said switchcore matrix, each of said output switchports being associated with one of said matrix columns;

connecting each of said switchports to an external information cell communications device;

asynchronously transmitting and receiving said stream of information cells from said switchcore matrix;

mounting a plurality of single-cell buffers, each of said single-cell buffers being mounted at a different one of said crosspoints of said switchcore matrix;

reporting to each of said input switchports whether each of said single-cell crosspoint buffers on said input switchport's associated row contains an information cell; and controlling access by said information cells to said switchcore matrix by holding said information cells in said input buffer until one of said single-cell crosspoint buffers is empty.

24. The method as set forth in claim 23 wherein the step of controlling access by said information cells to said switchcore matrix includes selectively sizing each of said input buffers for the type of communications traffic to be transmitted through said buffer.

25. The method as set forth in claim 24 wherein the step of controlling access by said information cells to said switchcore matrix includes translating logic addresses from said switchports to physical addresses in said switchcore with an asynchronous transfer mode (ATM) space switching protocol.

26. The method as set forth in claim 25 wherein the step of translating logic addresses to physical addresses includes:

identifying target switchports to which an information cell is addressed;

identifying target switchports that are free;

comparing said addressed target switchports with said free target switchports to identify which of said addressed target switchports are free; and transmitting said information cell to said addressed target switchports that are free.

27. A method for controlling the flow of information cells within a communications system comprising the steps of:

providing selectable routing paths for the routing of said information cells from input points to output points of a switchcore matrix having a plurality of rows, columns, and crosspoints thereof;

electronically connecting a plurality of switchports to the input points of said switchcore matrix to transmit information cells to said switchcore matrix;

electronically connecting a plurality of switchports to the output points of said switchcore matrix to receive information cells from said switchcore matrix;

connecting each of said switchports to an external information cell communications device; and controlling access, by each of said information cells, to said switchcore matrix, said access controlling step comprising:

holding said information cells in at least one input buffer located within each of said switchports connected to said input points until one of said routing paths is available, said step of holding said information cells comprising:

selectively sizing each of said input buffers for the type of communications traffic to be transmitted through said buffer; and translating logic addresses from switchports to physical addresses in said switchcore with an asynchronous transfer mode (ATM) space switching protocol, said step of translating logic addresses to physical addresses comprising:

identifying target switchports to which an information cell is addressed;

identifying target switchports that are free;

comparing said addressed target switchports with said free target switchports to identify which of said addressed target switchports are free; and transmitting said information cell to said addressed target switchports that are free, said transmitting step comprising:

measuring the length of time required to identify and compare said addressed target switchports with said free target switchports; and phase shifting incoming and outgoing information cells an amount equivalent to said length of time required to identify and compare said addressed target switchports with said free target switchports.

28. The method as set forth in claim 27 wherein the step of providing selectable routing paths for the routing of information cells includes providing one or more single-cell buffers for each of said routing paths in said switchcore matrix.

29. The method as set forth in claim 28 further comprising the step of mounting double-directed connections at the input and output points of said switchcore matrix.

30. The method as set forth in claim 29 further comprising the step of mounting said switchcore matrix, said single-cell buffers, and said double-directed connections on a single integrated circuit.

31. A data transfer switch comprising:

means for providing selectable routing paths for the routing of said information cells from input points to output points of a switchcore matrix having a plurality of rows, columns, and crosspoints thereof;

means for electronically connecting a plurality of input switchports to the input points of said switchcore matrix, each of said input switchports including at least one input buffer and being associated with one of said matrix rows;

means for electronically connecting a plurality of output switchports to the output points of said switchcore matrix, each of said output switchports being associated with one of said matrix columns;

means for connecting each of said switchports to an external information cell communications device;

means for asynchronously transmitting and receiving said stream of information cells from said switchcore matrix;

a plurality of single-cell buffers each of said single-cell buffers being mounted at a different one of said crosspoints of said switchcore matrix;

means for reporting to each of said input switchports whether each of said single-cell crosspoint buffers on said input switchport's associated row contains an information cell; and means for controlling access by said information cells to said switchcore matrix by holding said information cells in said input buffer until one of said single-cell crosspoint buffers is empty.

32. The data switch of claim 31 wherein each of said input buffers is selectively sized for the type of communications traffic to be transmitted through said buffer.

33. The data switch of claim 32 wherein the means for controlling access to said switchcore matrix includes means for translating logic addresses from said switchports to physical addresses in said switchcore with an asynchronous transfer mode (ATM) space switching protocol.

34. The data switch of claim 33 wherein the means for translating logic addresses to physical addresses includes:

means for identifying target switchports to which an information cell is addressed;

means for identifying target switchports that are free;

means for comparing said addressed target switchports with said free target switchports to identify which of said addressed target switchports are free; and means for transmitting said information cell to said addressed target switchports that are free.

35. A data transfer switch comprising:

means for providing selectable routing paths for the routing of said information cells from input points to output points of a switchcore matrix having a plurality of rows, columns, and crosspoints thereof;

means for electronically connecting a plurality of switchports to the input points of said switchcore matrix to transmit information cells to said switchcore matrix;

means for electronically connecting a plurality of switchports to the output points of said switchcore matrix to receive information cells from said switchcore matrix;

means for connecting each of said switchports to an external information cell communications device; and means for controlling access, by each of said information cells, to said switchcore matrix, said access controlling means comprising:

at least one input buffer, located within each of said switchports connected to said input points, for holding said information cells until one of said routing paths is available, each of said input buffers being selectively sized for the type of communications traffic to be transmitted through said buffer; and means for translating logic addresses from said switchports to physical addresses in said switchcore with an asynchronous transfer mode (ATM) space switching protocol, said means for translating logic addresses to physical addresses comprising:

means for identifying target switchports to which an information cell is addressed;

means for identifying target switchports that are free;

means for comparing said addressed target switchports with said free target switchports to identify which of said addressed target switchports are free; and means for transmitting said information cell to said addressed target switchports that are free, said transmitting means comprising:
  means for measuring the length of time required to identify and compare said addressed target switchports with said free target switchports; and
  means for phase shifting incoming and outgoing information cells an amount equivalent to said length of time required to identify and compare said addressed target switchports with said free target switchports.

36. The data switch of claim 35 wherein the means for providing selectable routing paths for the routing of information cells includes means for providing one or more single-cell buffers for each of said routing paths in said switchcore matrix.

37. The data switch of claim 36 wherein said input points and output points comprise double-directed connections.

38. The data switch of claim 37 wherein said switchcore matrix, said single-cell buffers, and said double-directed connections are mounted on a single integrated circuit.

* * * * *